US012535969B2

(12) United States Patent
Kanno et al.

(10) Patent No.: US 12,535,969 B2
(45) Date of Patent: *Jan. 27, 2026

(54) MEMORY SYSTEM AND METHOD FOR CONTROLLING NONVOLATILE MEMORY

(71) Applicant: Kioxia Corporation, Tokyo (JP)

(72) Inventors: Shinichi Kanno, Tokyo (JP); Hideki Yoshida, Yokohama Kanagawa (JP)

(73) Assignee: Kioxia Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/591,444

(22) Filed: Feb. 29, 2024

(65) Prior Publication Data
US 2024/0256184 A1 Aug. 1, 2024

Related U.S. Application Data

(63) Continuation of application No. 16/984,238, filed on Aug. 4, 2020, now Pat. No. 11,947,837, which is a (Continued)

(30) Foreign Application Priority Data

Dec. 8, 2017 (JP) ................. 2017-236269

(51) Int. Cl.
G06F 3/06 (2006.01)
(52) U.S. Cl.
CPC .......... G06F 3/0659 (2013.01); G06F 3/0604 (2013.01); G06F 3/064 (2013.01);
(Continued)

(58) Field of Classification Search
CPC ...... G06F 3/0659; G06F 3/0604; G06F 3/064; G06F 3/0656; G06F 3/0679; G06F 3/0683
See application file for complete search history.

(56) References Cited

U.S. PATENT DOCUMENTS 8,144,512 B2  3/2012  Huang et al.
8,407,418 B2  3/2013  Kurashige
(Continued)

FOREIGN PATENT DOCUMENTS

CN   116010157 A    4/2023
JP   2011-238176 A   11/2011
(Continued)

OTHER PUBLICATIONS

Yiying Zhang et al., "De-indirection for Flash-based SSDs with Nameless Writes", 10th USENIX Conference on File and Storage Technologies (FAST '12), Feb. 14-17, 2012, pp. 1-16.

Primary Examiner — Francisco A Grullon
(74) Attorney, Agent, or Firm — Maier & Maier, PLLC

(57) ABSTRACT

According to one embodiment, a memory system receives, from a host, a write request including a first identifier associated with one write destination block and storage location information indicating a location in a write buffer on a memory of the host in which first data to be written is stored. When the first data is to be written to a nonvolatile memory, the memory system obtains the first data from the write buffer by transmitting a transfer request including the storage location information to the host, transfers the first data to the nonvolatile memory, and writes the first data to the one write destination block.

20 Claims, 22 Drawing Sheets

Related U.S. Application Data continuation of application No. 16/004,601, filed on Jun. 11, 2018, now Pat. No. 10,768,858.

(52) U.S. Cl.
CPC .......... *G06F 3/0656* (2013.01); *G06F 3/0679* (2013.01); *G06F 3/0683* (2013.01)

(56) References Cited

U.S. PATENT DOCUMENTS

| | | | |
|---|---|---|---|
| 8,880,483 B2 | 11/2014 | Gorobets | |
| 9,269,445 B1 | 2/2016 | Abe et al. | |
| 9,858,003 B2 | 1/2018 | Hashimoto et al. | |
| 2004/0098530 A1* | 5/2004 | Earl | G06F 13/385 710/315 |
| 2009/0164705 A1 | 6/2009 | Gorobets | |
| 2011/0149650 A1 | 6/2011 | Huang et al. | |
| 2011/0149651 A1 | 6/2011 | Gorobets et al. | |
| 2011/0153913 A1* | 6/2011 | Huang | G06F 12/0246 711/E12.001 |
| 2011/0208905 A1 | 8/2011 | Shaeffer et al. | |
| 2012/0155166 A1 | 6/2012 | Li | |
| 2012/0210095 A1 | 8/2012 | Nellans et al. | |
| 2013/0046942 A1 | 2/2013 | Namba et al. | |
| 2013/0073795 A1 | 3/2013 | Hasegawa | |
| 2013/0191705 A1 | 7/2013 | Watanabe et al. | |
| 2014/0237205 A1 | 8/2014 | Takefman et al. | |
| 2014/0281166 A1 | 9/2014 | Wang et al. | |
| 2015/0254188 A1 | 9/2015 | Yano et al. | |
| 2016/0070488 A1* | 3/2016 | Shaharabany | G06F 3/0611 711/162 |
| 2016/0098219 A1 | 4/2016 | Nakata | |
| 2016/0172045 A1 | 6/2016 | Shukla et al. | |
| 2016/0188224 A1 | 6/2016 | Yin et al. | |
| 2016/0211014 A1 | 7/2016 | Lee et al. | |
| 2016/0283125 A1 | 9/2016 | Hashimoto et al. | |
| 2016/0313921 A1 | 10/2016 | Kojima | |
| 2016/0342545 A1 | 11/2016 | Arai et al. | |
| 2017/0075614 A1 | 3/2017 | Kanno | |
| 2017/0123664 A1* | 5/2017 | Parker | G06F 3/0616 |
| 2017/0123721 A1 | 5/2017 | Sela et al. | |
| 2017/0221569 A1 | 8/2017 | Akamine et al. | |
| 2017/0262176 A1 | 9/2017 | Kanno | |
| 2017/0262228 A1 | 9/2017 | Kanno | |
| 2017/0262365 A1 | 9/2017 | Kanno | |
| 2017/0263326 A1 | 9/2017 | Kondo | |
| 2017/0271017 A1 | 9/2017 | Kanamori et al. | |
| 2018/0075902 A1 | 3/2018 | Shirakawa et al. | |
| 2018/0107391 A1* | 4/2018 | Hashimoto | G06F 12/0246 |
| 2018/0107594 A1* | 4/2018 | Lee | G06F 12/1027 |
| 2018/0247696 A1* | 8/2018 | Takizawa | G11C 16/10 |
| 2019/0034364 A1 | 1/2019 | Lee et al. | |

FOREIGN PATENT DOCUMENTS

| | | |
|---|---|---|
| JP | 2012-128660 A | 7/2012 |
| JP | 2013-69059 A | 4/2013 |
| JP | 2017-54465 A | 3/2017 |
| JP | 2017-162067 A | 9/2017 |
| JP | 2017-162068 A | 9/2017 |

* cited by examiner

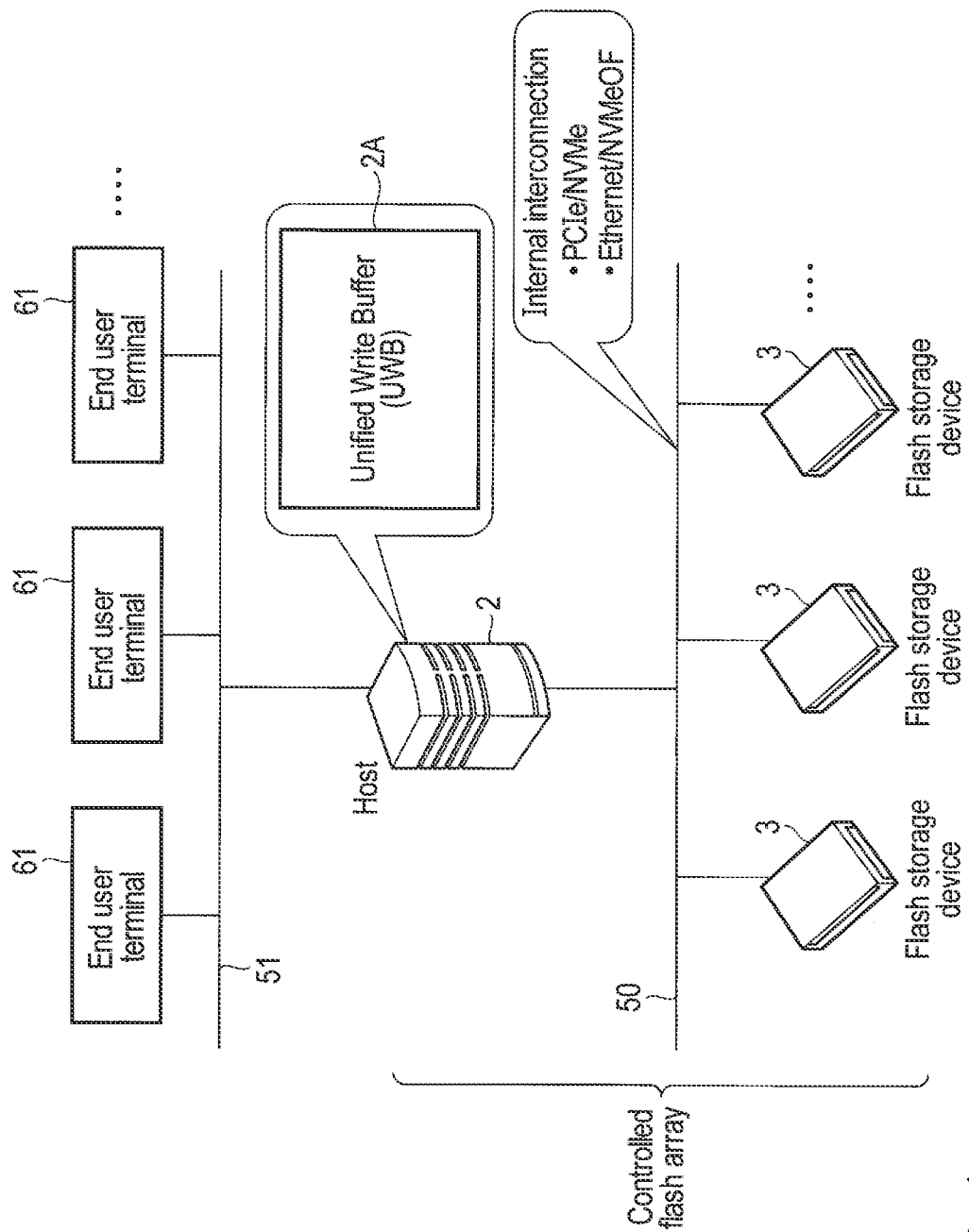
F I G. 1

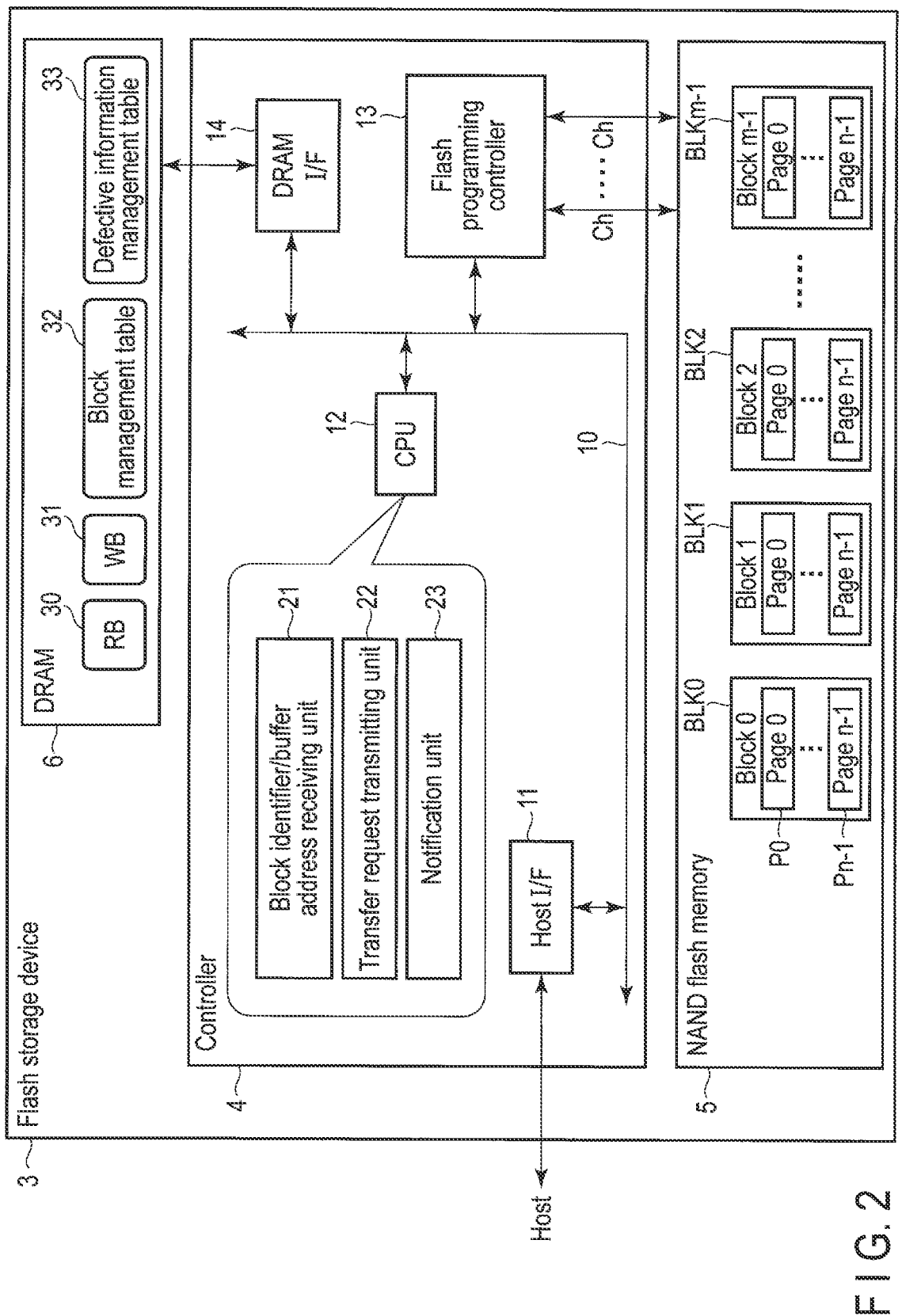
F I G. 2

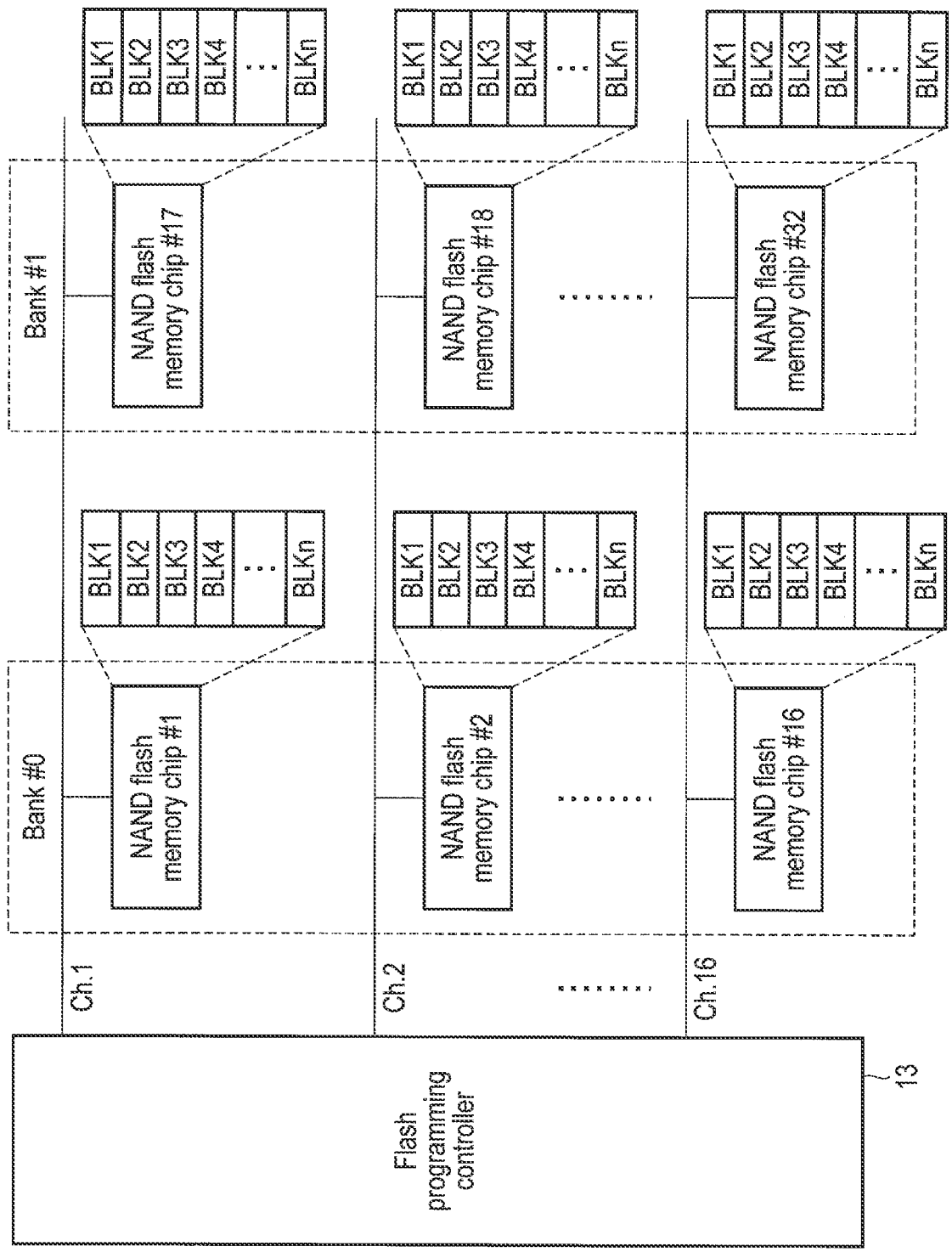
F I G. 3

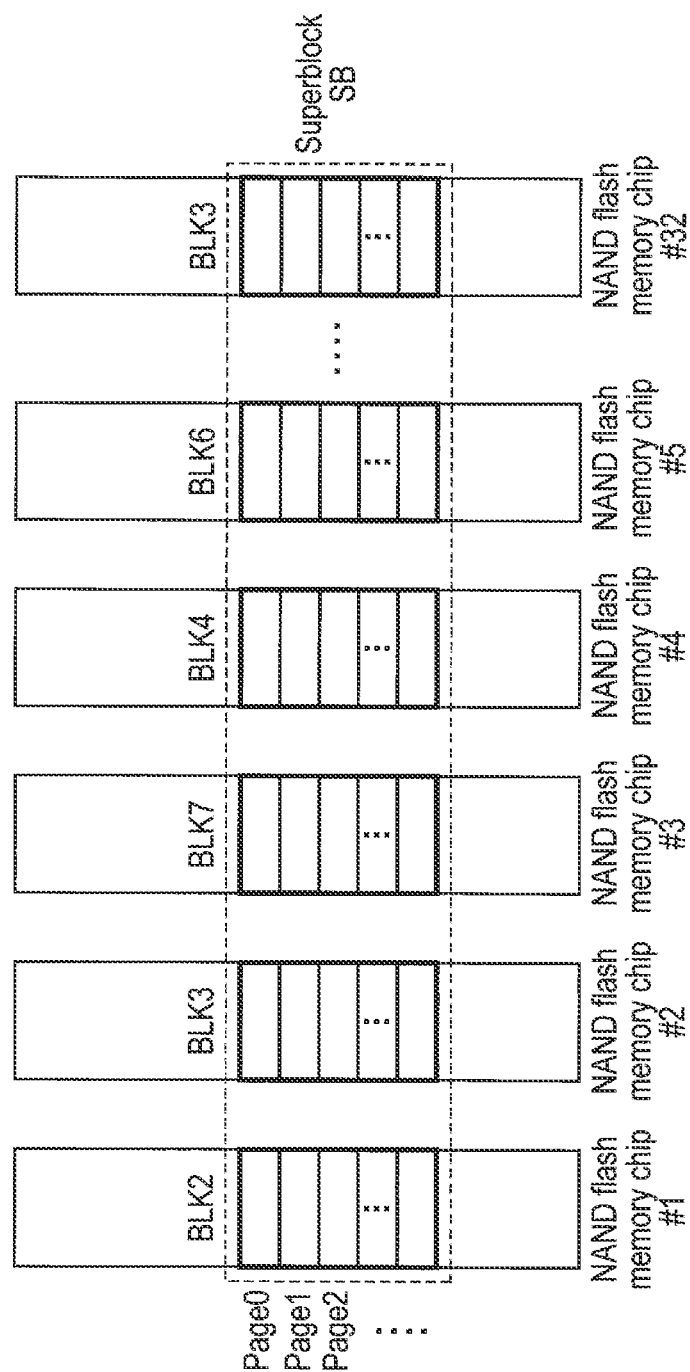
F I G. 4

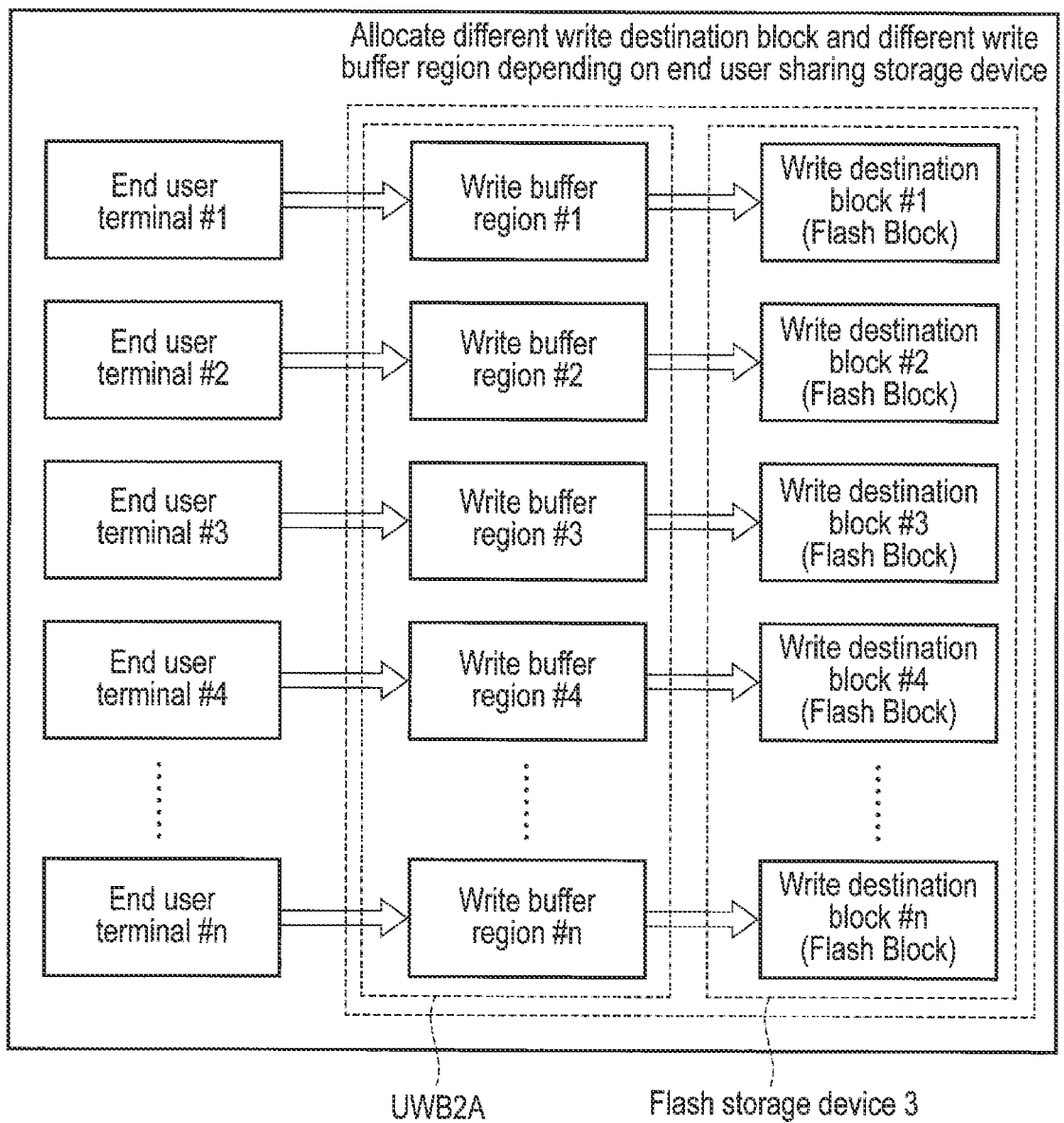
F I G. 5

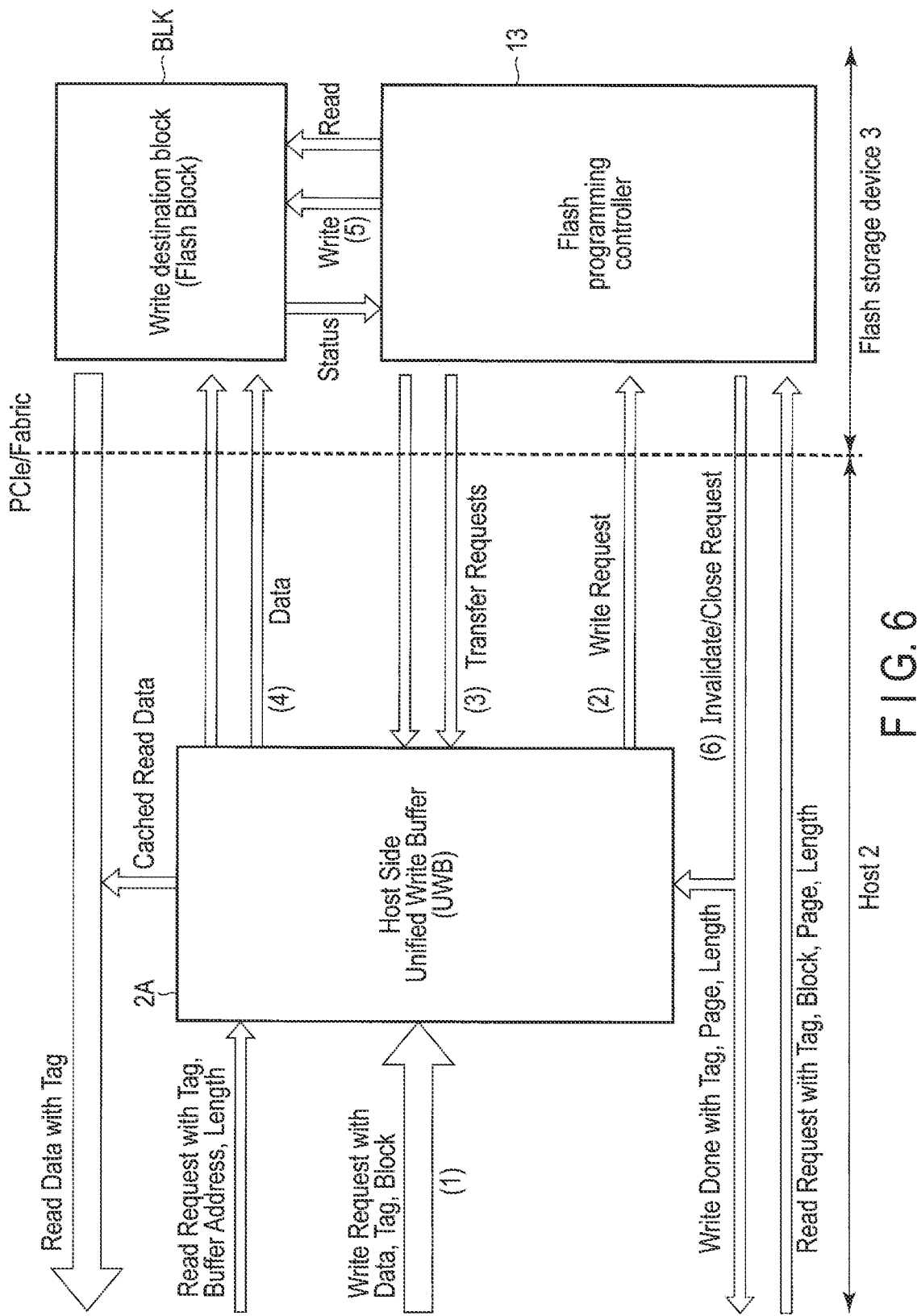
F I G. 6

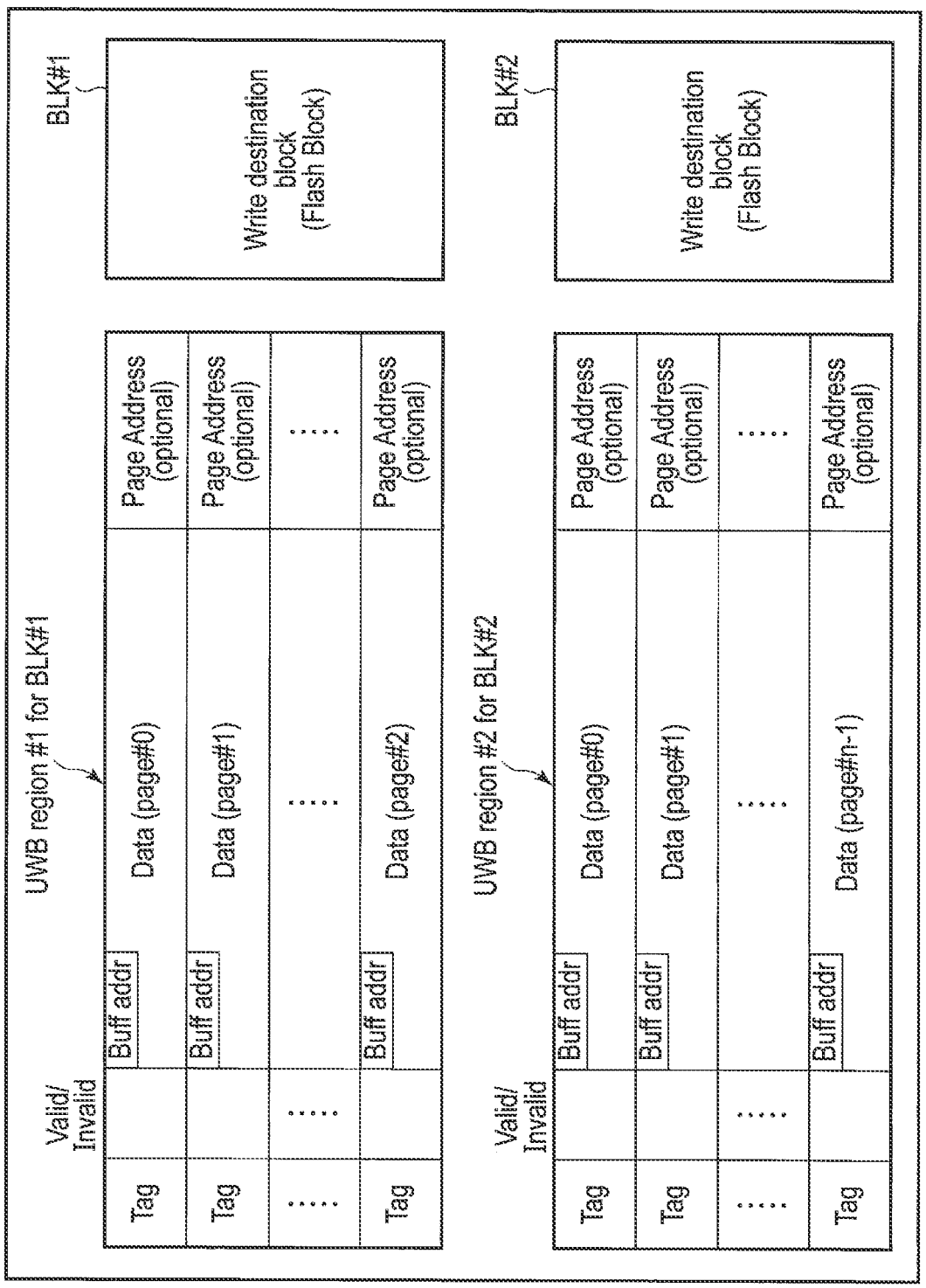
F I G. 7

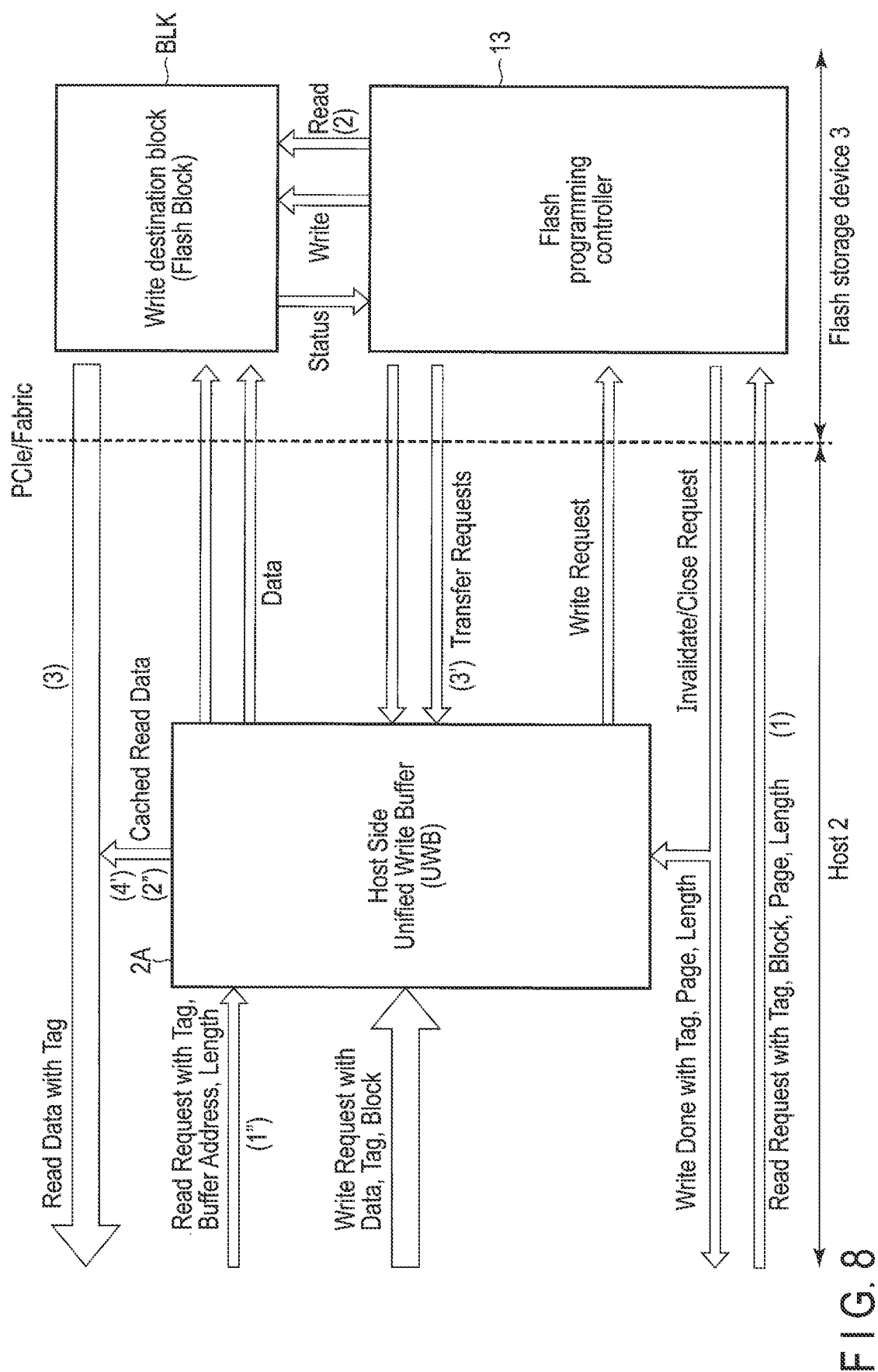
F I G. 8

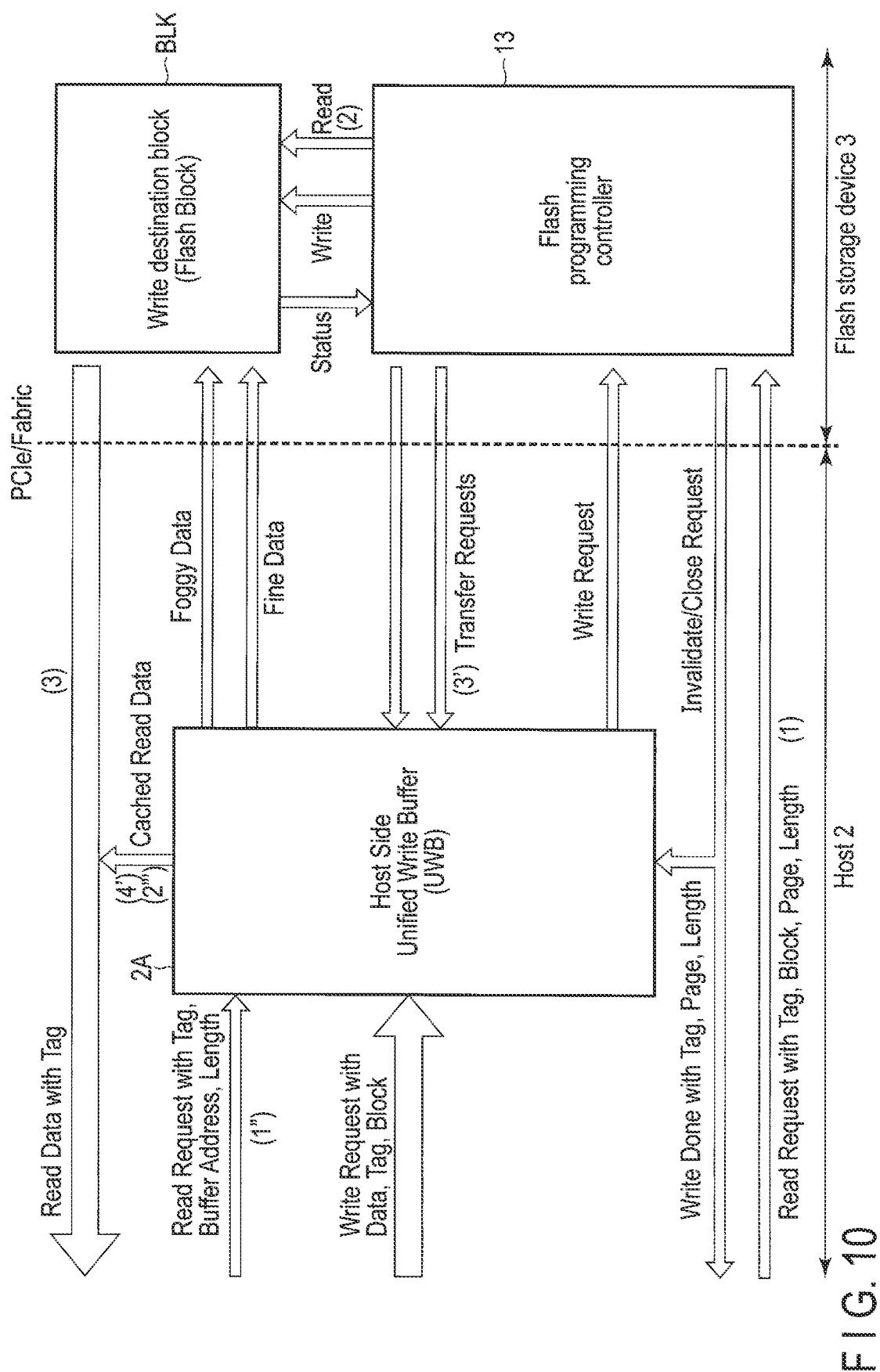
F I G. 10

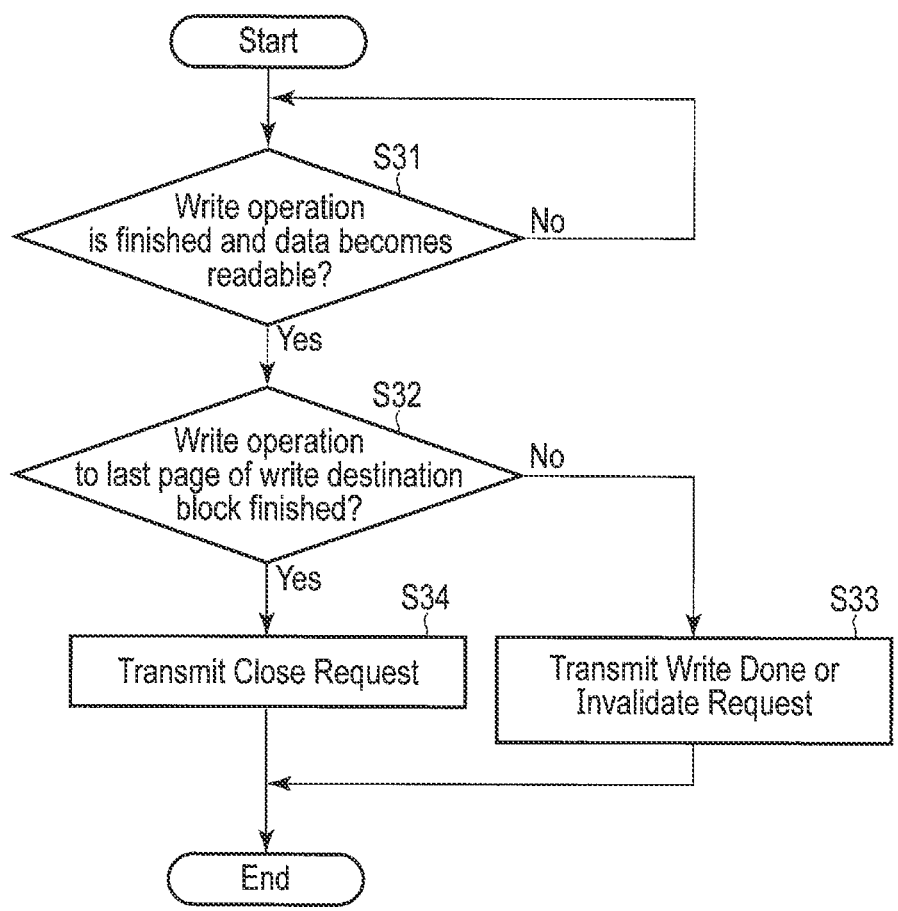
F I G. 12

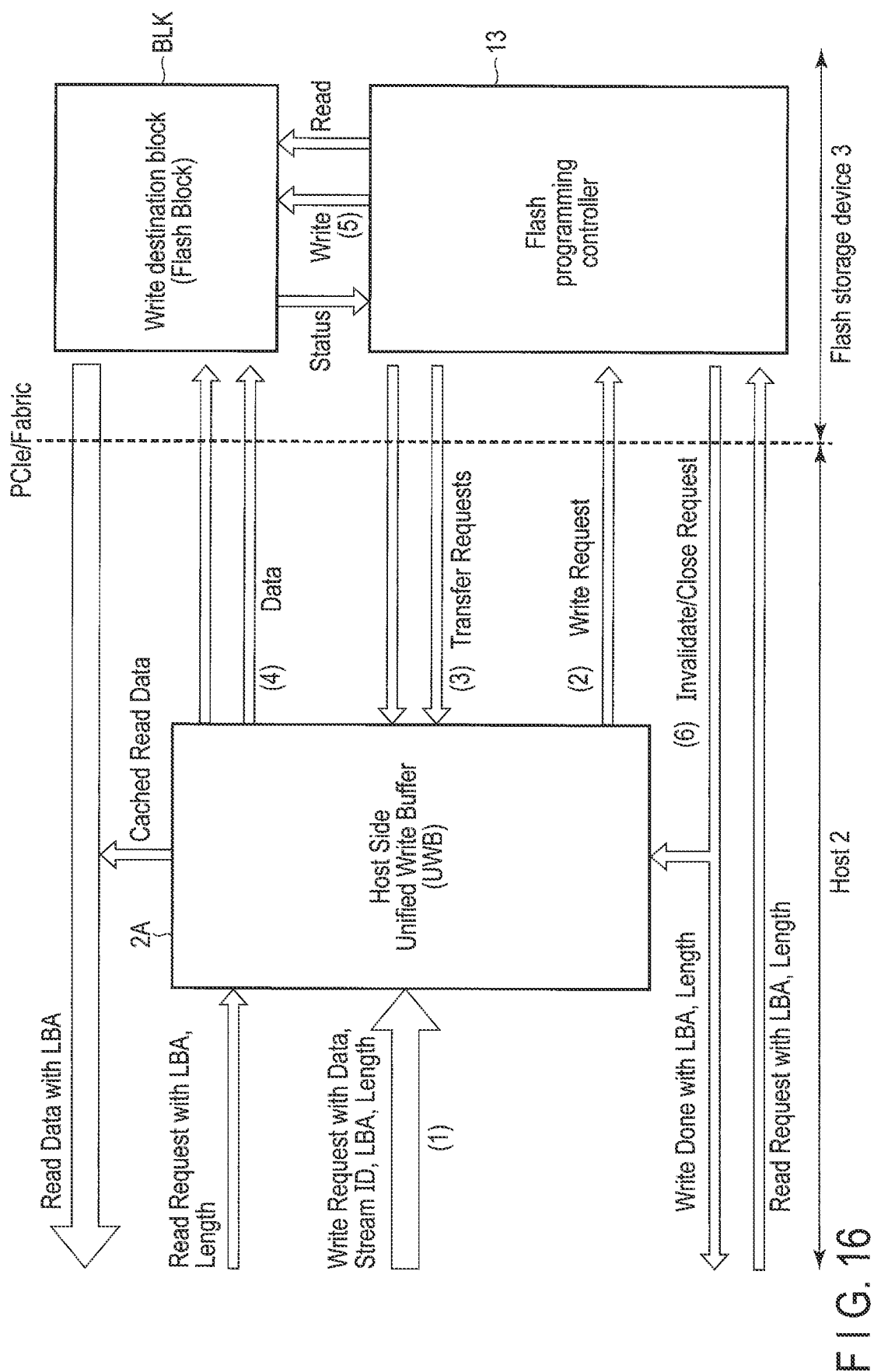
F I G. 16

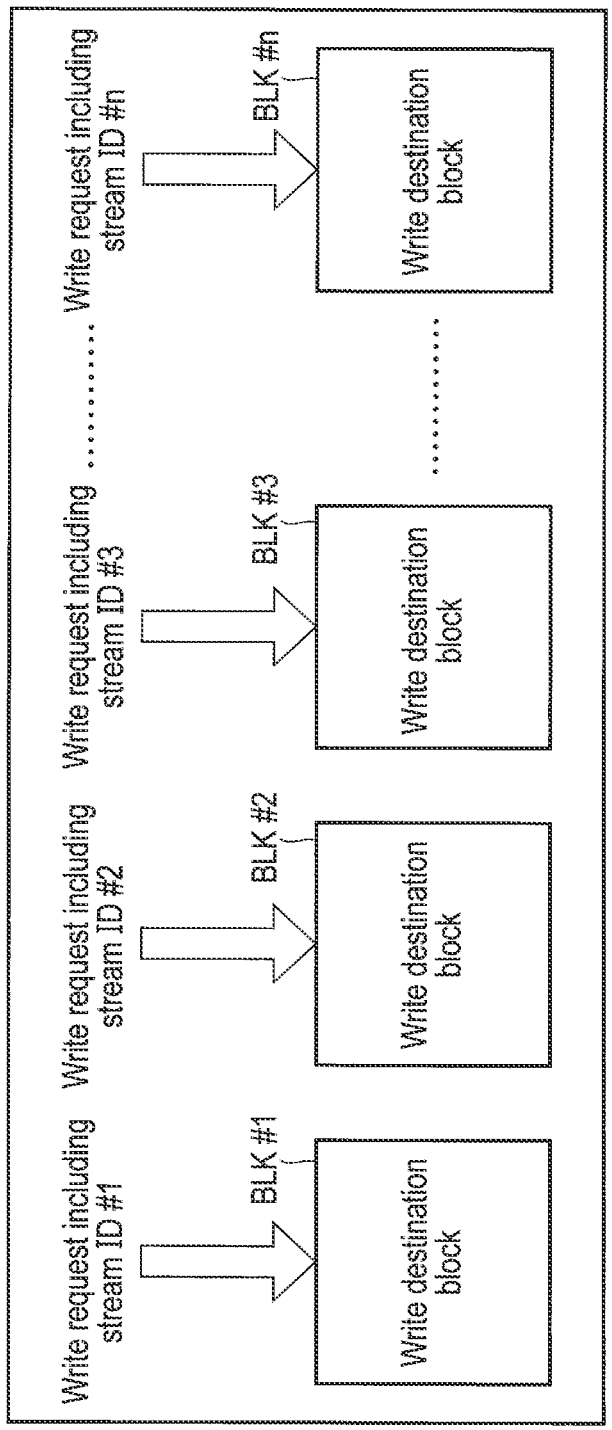
F I G. 17

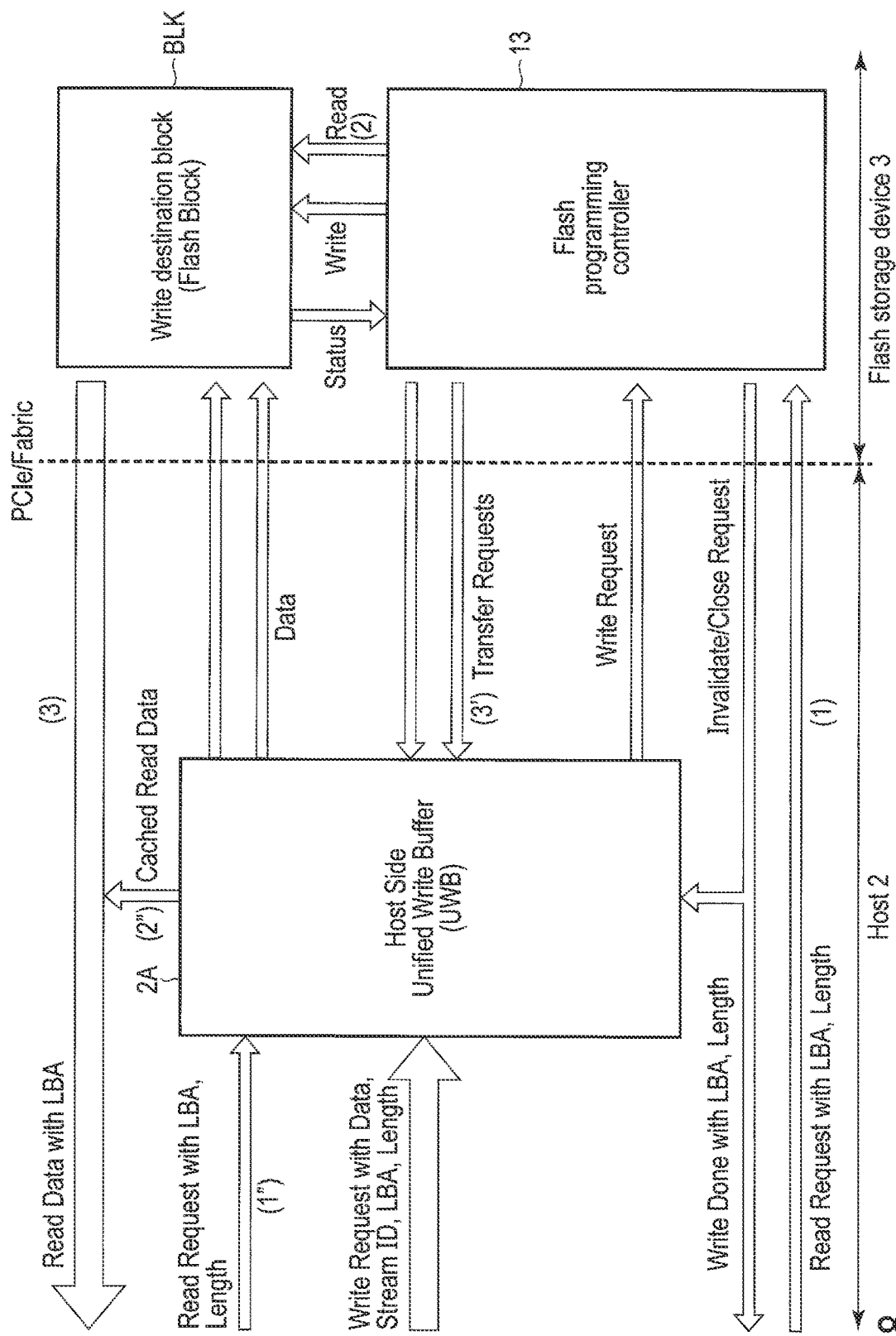
F I G. 18

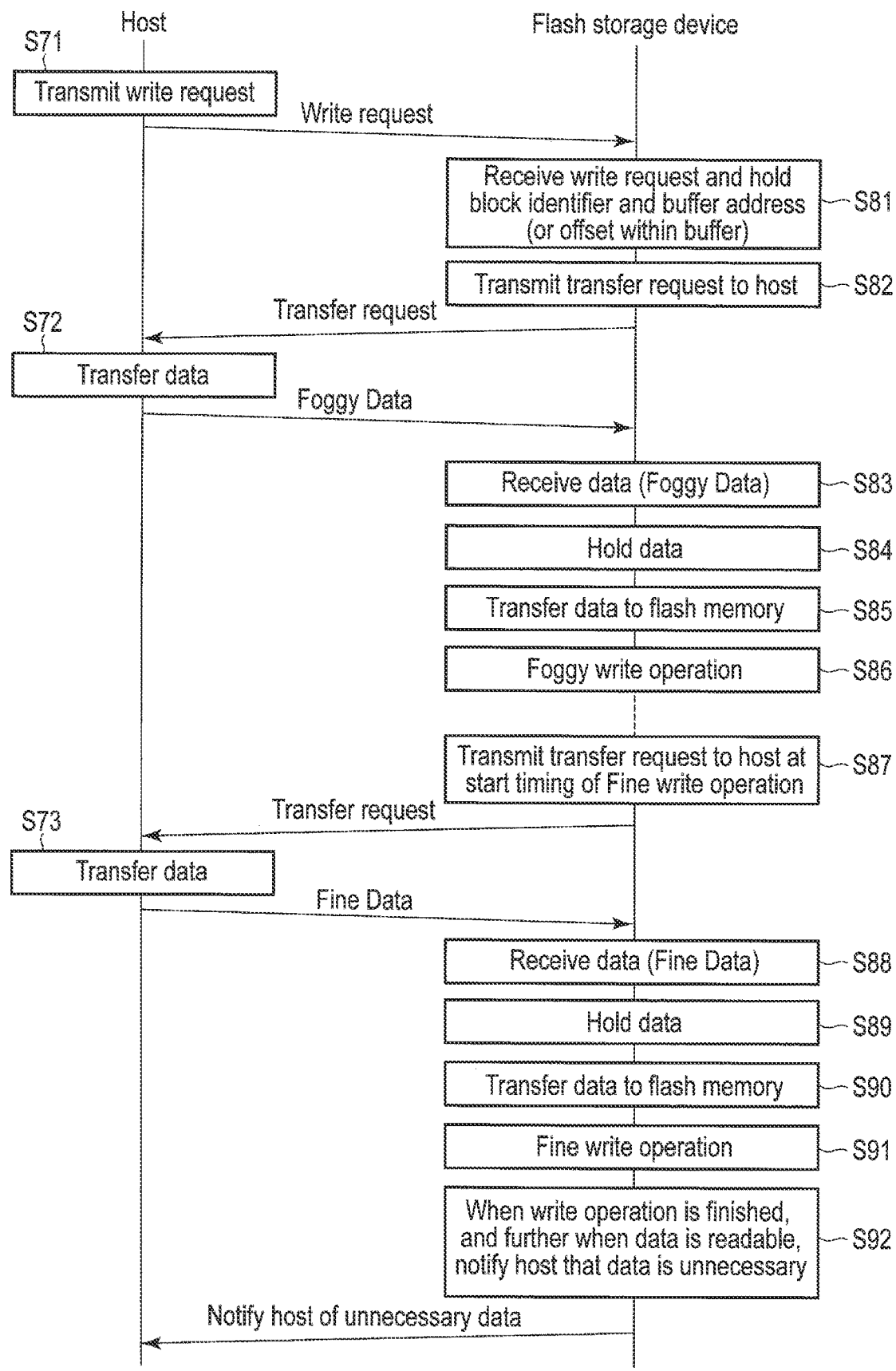
F I G. 19

MEMORY SYSTEM AND METHOD FOR CONTROLLING NONVOLATILE MEMORY

CROSS-REFERENCE TO RELATED APPLICATIONS

This application is a continuation application of application Ser. No. 16/984,238 filed Aug. 4, 2020 which is a continuation of Ser. No. 16/004,601 filed Jun. 11, 2018 (now U.S. Pat. No. 10,768,858 issued Sep. 8, 2020), and is based upon and claims the benefit of priority from Japanese Patent Application No. 2017-236269, filed Dec. 8, 2017, the entire contents of which are incorporated herein by reference.

FIELD

Embodiments described herein relate generally to a technology for controlling a nonvolatile memory.

BACKGROUND

In recent years, memory systems comprising a nonvolatile memory have become widespread. One of the memory systems has been known as a solid state drive (SSD) based on NAND flash technology.

In the server of a data center, an SSD is used as a storage device.

High I/O performance has been required for the storage device used in a host computing system such as a server.

For this reason, recently, a new interface between a host and a storage device has been proposed.

In some cases, recent storage devices have been required to write different types of data to different write destination blocks.

However, when the number of write destination blocks available at the same time is increased, the number of write buffers necessary for temporarily storing the write data to be written to individual write destination blocks should be also increased. Normally, the capacity of a random access memory in a storage device is limited. Thus, in some cases, it is difficult to prepare a sufficient number of write buffers in a storage device. Therefore, in the actual base, the number of write destination blocks available at the same time is limited.

BRIEF DESCRIPTION OF THE DRAWINGS

FIG. 1 is a block diagram showing the relationship between a host and memory systems (flash storage devices).

FIG. 2 is a block diagram showing a configuration example of the flash storage device.

FIG. 3 is a block diagram showing the relationship between a plurality of channels and a plurality of NAND flash memory chips used in the flash storage device.

FIG. 4 shows a configuration example of a superblock used in the flash storage device.

FIG. 5 shows the relationship between a plurality of write destination blocks corresponding to a plurality of end users and a plurality of write buffer regions.

FIG. 6 is a block diagram shown for explaining the relationship between the flash storage device and a UWB on the host side and a data write process performed by the host and the flash storage device.

FIG. 7 shows an example of the relationship between a plurality of write destination blocks and a plurality of write buffer regions (UWB regions).

FIG. 8 is a block diagram shown for explaining the relationship between the flash storage device and the UWB on the host side and a data read process performed by the host and the flash storage device.

FIG. 10 is a block diagram shown for explaining the relationship between the flash storage device which supports foggy-fine writing and the UWB on the host side and a data read process performed by the host and the flash storage device.

FIG. 12 is a flowchart showing a procedure of a notification process performed by the flash storage device.

FIG. 16 is a block diagram shown for explaining the relationship between the flash storage device which supports stream writing and the UWB on the host side and a data write process performed by the host and the flash storage device.

FIG. 17 shows the relationship between a plurality of stream IDs and a plurality of write destination blocks associated with the stream IDs.

FIG. 18 is a block diagram shown for explaining the relationship between the flash storage device which supports stream writing and the UWB on the host side and a data read process performed by the host and the flash storage device.

FIG. 19 is a sequence diagram showing a procedure of a data write process performed by the flash storage device which supports foggy-fine writing and the host.

DETAILED DESCRIPTION

Figure 9:
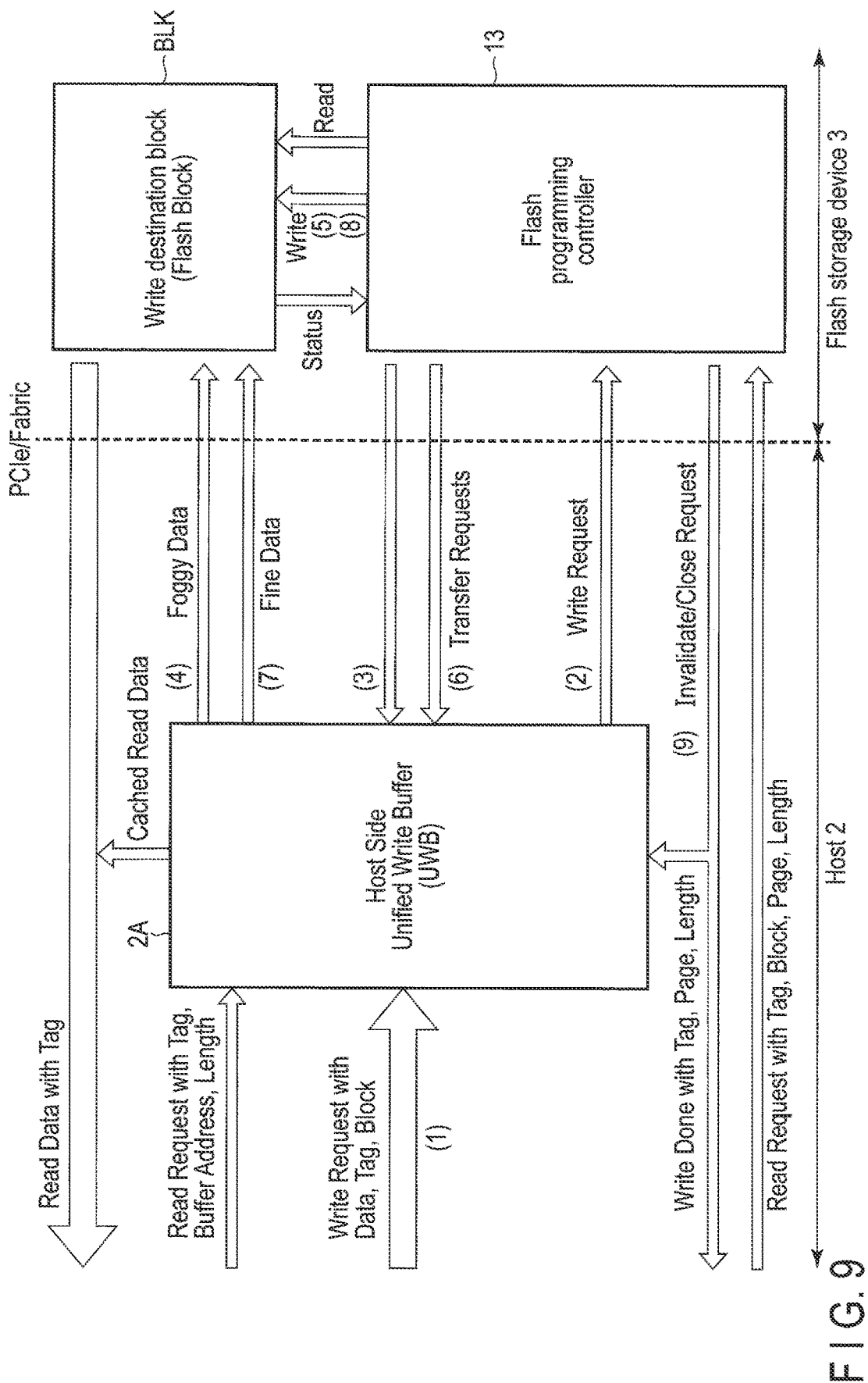
FIG. 9 is a block diagram shown for explaining the relationship between the flash storage device which supports foggy-fine writing and the UWB on the host side and a data write process performed by the host and the flash storage device.

Various embodiments will be described hereinafter with reference to the accompanying drawings.

In general, according to one embodiment, a memory system connectable to a host, comprises a nonvolatile memory, and a controller electrically connected to the nonvolatile memory. The controller is configured to manage a plurality of write destination blocks allocated from a plurality of blocks provided in the nonvolatile memory. The controller receives, from the host, a write request including a first identifier associated with one write destination block and storage location information indicating a location in a write buffer on a memory of the host in which first data to be written is stored, and holds the first identifier and the storage location information included in the received write request. When the first data is to be written to the nonvolatile memory, the controller obtains the first data from the write buffer by transmitting a transfer request including the storage location information to the host, transfers the first data to the nonvolatile memory, and writes the first data to the one write destination block. The controller holds the first data until transfer of the first data to the nonvolatile memory is finished. When writing of the first data is finished, and further when the first data becomes readable from the nonvolatile memory, the controller notifies the host that the first data held in the write buffer is unnecessary.

Firstly, the relationship between a host and a memory system will be described with reference to FIG. 1.

The memory system is a semiconductor storage device configured to write data to a nonvolatile memory and read data from the nonvolatile memory. The memory system is realized as a flash storage device 3 based on NAND flash technology.

A host (host device) 2 is configured to control a plurality of flash storage devices 3. The host 2 is realized by an information processing apparatus configured to use a flash array including the plural flash storage devices 3 as storage. The information processing apparatus may be either a personal computer or a server computer.

The flash storage device 3 may be used as one of a plurality of storage devices provided in a storage array. The storage array may be connected to an information processing apparatus such as a server computer via a cable or a network. The storage array includes a controller which controls a plurality of storage devices (for example, the flash storage devices 3) provided in the storage array. When the flash storage device 3 is applied to the storage array, the controller of the storage array may function as the host of the flash storage device 3.

Hereinafter, this specification exemplarily explains a case where an information processing apparatus such as a server computer functions as the host 2.

The host (server) 2 and the plural flash storage devices 3 are interconnected via an interface 50 (internal interconnection). For example, PCI Express (PCIe) (registered trademark), NVM Express (NVMe) (registered trademark), Ethernet (registered trademark) or NVMe over Fabrics (NVMeOF) may be used for the interface 50 for the interconnection. However, the interface 50 is not limited to these examples.

A typical example of the server computer which functions as the host 2 is a server computer (hereinafter, referred to as a server) in a data center.

When the host 2 is realized by a server in a data center, the host (server) 2 may be connected to a plurality of end user terminals (clients) 61 via a network 51. The host 2 is capable of providing the end user terminals 61 with various services.

Examples of the services provided by the host (server) 2 include, for example, (1) a Platform as a Service (PaaS) which provides each client (end user terminal 61) with a system running platform and (2) Infrastructure as a Service (IaaS) which provides each client (end user terminal 61) with infrastructure such as a virtual server.

A plurality of virtual machines may be run on a physical server which functions as the host (server) 2. Each virtual machine running on the host (server) 2 is capable of functioning as a virtual server configured to provide some corresponding clients (end user terminals 61) with various types of services.

The host (server) 2 includes a storage management function for managing the flash storage devices 3 included in the flash array, and a front-end function for providing each end user terminal 61 with various services including storage access.

Each flash storage device 3 includes a nonvolatile memory such as a NAND flash memory. Each flash storage device 3 manages a plurality of write destination blocks allocated from a plurality of provided in the nonvolatile memory. The write destination blocks refer to the blocks to which data should be written. A write request (write command) transmitted from the host 2 to each flash storage device 3 includes an identifier associated with one write destination block to which data should be written. Based on the identifier included in the received write request, the flash storage device 3 determines, of the write destination blocks, one write destination block to which the data should be written.

The identifier included in the write request may be a block identifier specifying a specific write destination block. The block identifier may be indicated by a block address (block number). When the flash storage device 3 includes a plurality of NAND flash memory chips, the block identifier may be indicated by the combination of a block address (block number) and a chip number.

When the flash storage device 3 supports stream writing, the identifier included in the write request may be the identifier (stream ID) of one of a plurality of streams. In stream writing, a plurality of write destination blocks are associated with a plurality of streams, respectively. In other words, when the flash storage device 3 receives a write request including a stream ID from the host 2, the flash storage device 3 writes data to the write destination block associated with a stream corresponding to the stream ID. When the flash storage device 3 receives a write request including a stream ID different from the above stream ID from the host 2, the flash storage device 3 writes data to the write destination block different from the above write destination block and associated with a stream different from the above stream and corresponding to the different stream ID.

The write destination blocks managed by the flash storage device 3 may be used by a plurality of end users (clients) sharing the flash storage device 3. In this case, in the flash storage device 3, the same number of write destination blocks as the number of end users sharing the flash storage device 3 or more write destination blocks are open.

In the environment where a plurality of write destination blocks available at the same time are present in the flash storage device 3, it is necessary to prepare the same number of write buffers as the number of write destination blocks.

In many cases, recent NAND flash memories have been configured to write data of a plurality of bits to each memory cell. Thus, it is necessary to hold data for a plurality of pages to be written to the write destination block, for each of the write destination blocks.

In some cases, in recent NAND flash memories, the following write method has been applied to reduce program disturbs. In the method, write data is written to a NAND flash memory by a multi-step program operation including a plurality of transfers of same write data to the NAND flash memory. A typical example of the write method is foggy-fine program operation. In this case, similarly, write data should be held until the entire multi-step program operation is finished. Thus, it is necessary to prepare the same number of write buffers as the number of write destination blocks.

In foggy-fine program operation, for example, first write data for a plurality of pages is transferred to a NAND flash memory, and the first write data is written to the first physical page (in other words, memory cells connected to a word line) (the first-step writing: foggy writing). Subsequently, foggy writing is performed for another physical page adjacent to the first physical page (in other words, memory cells connected to another word line). Subsequently, the first write data for the plural pages is transferred to the NAND flash memory again, and the first write data is written to the first physical page (second-step writing: fine writing). Subsequently, fine writing is performed for the physical page adjacent to the first physical page.

However, the capacity of the random access memory in the flash storage device 3 is limited. Thus, in some cases, it is difficult to prepare sufficient write buffers in number on the random access memory in the flash storage device 3. It is assumed that a large-capacity random access memory is prepared in the flash storage device 3. Even in this case, when the number of end users sharing the flash storage device 3 is less, the large-capacity random access memory is useless.

In the present embodiment, a predetermined storage area on the memory of the host 2 is used as a write buffer (hereinafter, referred to as a unified write buffer [UWB]) 2A. The UWB 2A on the host 2 side includes a plurality of write buffer regions corresponding to a plurality of write destination blocks.

The host 2 stores the write data to be written to one write destination block in the UWB 2A (in other words, a write buffer region corresponding to this write destination block). The host 2 transmits, to the flash storage device 3, a write request including an identifier (a block identifier or stream ID) associated with the one write destination block and storage location information indicating the location in the UWB 2A in which the write data is stored.

The flash storage device 3 receives the write request from the host 2 and holds the identifier and the storage location information included in the received write request. When the write data is to be written to the NAND flash memory, the flash storage device 3 obtains the write data from the UWB 2A by transmitting a transfer request including the storage location information to the host 2. For example, when the NAND flash memory is a triple-level-cell (TLC) flash memory which stores data of 3 bits for each memory cell, the write data for 3 pages to be written to the same physical page is obtained from the UWB 2A. Three page addresses may be allocated to each physical page. The flash storage device 3 writes the write data to the one write destination block (in other words, a physical page in the one write destination block).

The flash storage device 3 may write the write data to the one write destination block by full-sequence program operation.

Alternatively, the flash storage device 3 may write the write data to the one write destination block by multi-step program operation including a plurality of transfers of write data (for example, write data for 3 pages) to the NAND flash memory (for example, foggy-fine program operation). In this case, the flash storage device 3 firstly performs the first-step write operation. Subsequently, when the second-step write operation should be performed, the flash storage device 3 transmits a transfer request including the storage location information to the host 2 again. Every time the host device 2 receives a transfer request including the storage location information from the flash storage device 3, the host 2 transfers the write data to the flash storage device 3 from the UWB 2A. When the flash storage device 3 obtains the write data from the UWB 2A again, the flash storage device 3 performs the second-step write operation.

When the writing of the write data is finished, and further when the write data becomes readable from the NAND flash memory (in full-sequence program operation, when full-sequence program operation is finished; in foggy-fine program operation, when both foggy write operation and fine write operation are finished), the flash storage device 3 notifies the host 2 that the write data held in the UWB 2A is unnecessary.

In the present embodiment, a large number of write destination blocks can be used at the same time without preparing a large number of write buffers in the flash storage device 3. Thus, there is no need to provide a large-capacity random access memory in the flash storage device 3. Thus, it is possible to easily increase the number of end users who share the flash storage device 3 without increasing the cost of the flash storage device 3.

FIG. 2 shows a configuration example of the flash storage device 3.

The flash storage device 3 comprises a controller 4 and a nonvolatile memory (NAND flash memory) 5. The flash storage device 3 may further comprise a random access memory, for example, a DRAM 6.

The NAND flash memory 5 includes a memory cell array including a plurality of memory cells arranged in matrix. The NAND flash memory 5 may be either a NAND flash memory comprising a two-dimensional structure or a NAND flash memory comprising a three-dimensional structure.

The memory cell array of the NAND flash memory 5 includes a plurality of blocks BLK0 to BLKm-1. Each of blocks BLK0 to BLKm-1 includes a large number of pages (here, pages P0 to Pn-1). Blocks BLK0 to BLKm-1 function as erase units. Blocks may be referred to as erase blocks, physical blocks or physical erase blocks. Each of pages P0 to Pn-1 includes a plurality of memory cells connected to the same word line. Pages P0 to Pn-1 may be referred to as physical pages. Pages P0 to Pn-1 are the units of the operation for writing data and the operation for reading data.

The controller 4 is electrically connected to the NAND flash memory 5 which is a nonvolatile memory via a flash programming controller 13 such as a toggle controller or Open NAND Flash Interface (ONFI). The controller 4 operates as a memory controller configured to control the NAND flash memory 5. The controller 4 may be realized by a circuit such as a System-on-a-chip (SOC).

As shown in FIG. 3, the NAND flash memory 5 may include a plurality of NAND flash memory chips (NAND flash memory dies). Each NAND flash memory chip is independently operable. Thus, the NAND flash memory chips function as parallel operation units. In FIG. 3, sixteen channels Ch. 1 to Ch. 16 are connected to the flash programming controller 13, and two NAND flash memory chips are connected to each of the sixteen channels Ch. 1 to Ch. 16. In this case, sixteen NAND flash memory chips #1 to #16 connected to channels Ch. 1 to Ch. 16 may be organized as bank #0. The remaining sixteen NAND flash memory chips #17 to #32 connected to channels Ch. 1 to Ch. 16 may be organized as bank #1. The banks function as the units for the parallel operation of a plurality of memory modules by bank interleaving. In the configuration example of FIG. 3, the parallel operation of thirty-two NAND flash memory chips is realized at a maximum by the sixteen channels, and the bank interleaving using two banks.

Erase operation may be performed for either each block (physical block) or each superblock including a set of physical blocks which are operable in parallel. Each superblock may include thirty-two physical blocks selected from NAND flash memory chips #1 to #32 one by one although the configuration is not limited to this example. Each of NAND flash memory chips #1 to #32 may comprise a multiplane structure. For example, when each of NAND flash memory chips #1 to #32 comprises a multiplane structure including two planes, each superblock may include sixty-four physical blocks in total selected one by one from sixty-four planes corresponding to NAND flash memory chips #1 to #32.

FIG. 4 exemplarily shows a single superblock SB including thirty-two physical blocks (here, physical block BLK2 in NAND flash memory chip #1, physical block BLK3 in NAND flash memory chip #2, physical block BLK7 in NAND flash memory chip #3, physical block BLK4 in NAND flash memory chip #4, physical block BLK6 in NAND flash memory chip #5, . . . , physical block BLK3 in NAND flash memory chip #32).

The write destination block may be either a single physical block or a single superblock. Each superblock may include only one physical block. In this case, a single superblock is equivalent to a single physical block.

Now, this specification explains the configuration of the controller 4 shown in FIG. 2.

The controller 4 includes a host interface 11, a CPU 12, the flash programming controller 13, a DRAM interface 14, etc. The host interface 11, the CPU 12, the flash programming controller 13 and the DRAM interface 14 are interconnected via a bus 10.

The host interface 11 is a host interface circuit configured to perform communication with the host 2. The host interface 11 may be, for example, a PCIe controller (NVMe controller). When the flash storage device 3 is connected to the host 2 via Ethernet (registered trademark), the host interface 11 may be an NVMe over Fabrics (NVMeOF) controller. In the structure in which the flash storage device 3 is connected to the host 2 via Ethernet (registered trademark), the number of storage devices 3 can be easily increased depending on the need. Further, the number of hosts 2 can be easily increased.

The host interface 11 receives various requests (commands) from the host 2. These requests (commands) include a write request (write command), a read request (read command) and other various requests (commands).

The CPU 12 is a processor configured to control the host interface 11, the flash programming controller 13 and the DRAM interface 14. When the flash storage device 3 is powered on, the CPU 12 loads a control program (firmware) from the NAND flash memory 5 or a ROM (not shown) into the DRAM 6 and performs various processes by executing the firmware. The firmware may be loaded into an SRAM (not shown) in the controller 4. For example, the CPU 12 is capable of performing a command process for processing various commands received from the host 2. The operation of the CPU 12 is controlled by the firmware executed by the CPU 12. A command process may be partially or entirely performed by dedicated hardware in the controller 4.

The CPU 12 is capable of functioning as a block identifier/buffer address receiving unit 21, a transfer request transmitting unit 22 and a notification unit 23.

The block identifier/buffer address receiving unit 21 receives a write request including a block identifier and a buffer address from the host 2, and holds the block identifier and the buffer address in a predetermined storage area. The block identifier included in the write request may be a block address specifying a specific write destination block. Alternatively, the write request may include a stream ID instead of the block identifier. The block identifier or the stream ID functions as an identifier associated with one write destination block. The buffer address included in the write request is storage location information indicating the location in the UWB 2A in which the data to be written (write data) is stored. Alternatively, the write request may include an offset within the buffer as storage location information instead of the buffer address. The offset within the buffer indicates the offset location in the UWB 2A in which write data is stored.

When the write data is should be to the NAND flash memory 5, the transfer request transmitting unit 22 transmits a transfer request including storage location information (for example, a buffer address) to the host 2 and obtains the write data from the UWB 2A.

When the wiring of the write data is finished, and further when the write data is readable from the NAND flash memory 5, the notification unit 23 notifies the host 2 that the write data held in the UWB 2A is unnecessary.

The flash programming controller 13 is a memory control circuit configured to control the NAND flash memory 5 under the control of the CPU 12.

The DRAM interface 14 is a DRAM control circuit configured to control the DRAM 6 under the control of the CPU 12. A part of the storage area of the DRAM 6 is used to store a read buffer (RB) 30, a write buffer (WB) 31, a block management table 32 and a defective information management table 33. The read buffer (RB) 30, the write buffer (WB) 31, the block management table 32 and the defective information management table 33 may be stored in the SRAM (not shown) in the controller 4. The block management table 32 manages information indicating whether each of the data units stored in each block is valid data or invalid data. The defective information management table 33 manages a list of bad blocks.

FIG. 5 shows the relationship between a plurality of write destination blocks corresponding to a plurality of end users and a plurality of write buffer regions.

In the flash storage device 3, the state of each block is roughly categorized into an active block in which valid data is stored or a free block in which valid data is not stored. Each active block is managed by a list referred to as an active block pool. Each free block is managed by a list referred to as a free block pool.

In the present embodiment, the controller 4 allocates a plurality of blocks (free blocks) selected from the free block pool as the write destination blocks to which the write data received from the host 2 should be written. In this case, the controller 4 performs erase operation for the selected blocks (free blocks) to cause the blocks to be in a writable erased state. The blocks caused to be in a writable erased state are open write destination blocks. When a write destination block is fully filled with write data from the host 2, the controller 4 moves the write destination block to the active block pool, and allocates a new block (free block) from the free block pool as a new write destination block.

In the flash storage device 3, the same number of write destination blocks (flash blocks) as the number of end users (end user terminals) sharing the flash storage device 3 or more write destination blocks are opened. The UWB 2A on the host 2 side may include the same number of write buffer regions (UWB regions) as the number of write destination blocks (flash blocks).

In FIG. 5, write buffer region #1 is associated with write destination block #1, and all the data to be written to write destination block #1 is stored in write buffer region #1. Write buffer region #2 is associated with write destination block #2, and all the data to be written to write destination block #2 is stored in write buffer region #2. Write buffer region #3 is associated with write destination block #3, and all the data to be written to write destination block #3 is stored in write buffer region #3. Similarly, write buffer region #n is associated with write destination block #n, and all the data to be written to write destination block #n is stored in write buffer region #n.

The host 2 stores write data from end user terminal #1 in write buffer region #1, stores write data from end user terminal #2 in write buffer region #2, stores write data from end user terminal #3 in write buffer region #3, stores write data from end user terminal #4 in write buffer region #4 and stores write data from end user terminal #n in write buffer region #n.

The host 2 transmits, to the flash storage device 3, a write request including an identifier associated with write destination block #1 and storage location information indicating the location in write buffer region #1 in which write data from end user terminal #1 is stored. The identifier associated with write destination block #1 may be either a block identifier (block address) specifying write destination block #1 or a stream ID associated with write destination block #1.

The flash storage device 3 obtains write data equivalent to one physical page (for example, write data for three pages in a case of a TLC-flash memory) from write buffer region #1 by transmitting a transfer request including the storage location information to the host 2. In addition to the storage location information, the transfer request may include an identifier associated with write destination block #1 (for example, a block identifier specifying write destination block #1 or a stream ID associated with write destination block #1). In this manner, the host 2 is capable of easily specifying the write buffer region in which the write data to be transferred to the flash storage device 3 is stored, and the location (storage location) in the write buffer region.

The host 2 transmits, to the flash storage device 3, a write request including an identifier associated with write destination block #2 (for example, a block identifier specifying write destination block #2 or a stream ID associated with write destination block #2) and storage location information indicating the location in write buffer region #2 in which write data from end user terminal #2 is stored.

The flash storage device 3 obtains write data equivalent to one physical page (for example, write data for three pages in a case of a TLC-flash memory) from write buffer region #2 by transmitting a transfer request including the storage location information to the host 2. In addition to the storage location information, the transfer request may include an identifier associated with write destination block #2 (for example, a block identifier specifying write destination block #2 or a stream ID associated with write destination block #2). In this manner, the host 2 is capable of easily specifying the write buffer region in which the write data to be transferred to the flash storage device 3 is stored, and the location (storage location) in the write buffer region.

Similarly, the host 2 transmits, to the flash storage device 3, a write request including an identifier associated with write destination block #n (for example, a block identifier specifying write destination block #n or a stream ID associated with write destination block #n) and storage location information indicating the location in write buffer region #n in which write data from end user terminal #n is stored.

The flash storage device 3 obtains write data equivalent to one physical page (for example, write data for three pages in a case of a TLC-flash memory) from write buffer region #n by transmitting a transfer request including the storage location information to the host 2. In addition to the storage location information, the transfer request may include an identifier associated with write destination block #n (for example, a block identifier specifying write destination block #n or a stream ID associated with write destination block #n). In this manner, the host 2 is capable of easily specifying the write buffer region in which the write data to be transferred to the flash storage device 3 is stored, and the location (storage location) in the write buffer region.

FIG. 6 shows the relationship between the flash storage device 3 and the UWB 2A on the host side and a data write process performed by the host 2 and the flash storage device 3.

To simplify the illustration, FIG. 6 exemplarily shows a process for writing data to a single write destination block BLK. It is assumed that write data is written to a single write destination block BLK by full-sequence program operation.

(1) In the host 2, a flash storage manager is executed. The flash storage manager is host software managing the flash storage device 3. The flash storage manager may be incorporated into a device driver for the flash storage device 3. The flash storage manager manages the UWB 2A. When the flash storage manager receives, from upper level software (an application program or a file system), a request to write data, the flash storage manager stores in the UWB 2A a write request with the data to be written, a tag and a block identifier. The tag is an identifier for identifying the data. The tag may be a logical address such as a logical block address (LBA), a key of a key-value store, or a file identifier such as a file name. The block identifier may be the block address of the write destination block BLK. The write request may include the length of the data to be written. When the write data to be written has a fixed length, the write request may not include the length. The write request may include a page address indicating the page to which data should be written. The upper level software may issue the write request. The flash storage manager may receive the write request from the upper level software and store the received write request in the UWB 2A.

(2) The flash storage manager transmits a write request (write command) to the flash storage device 3. The write request includes a tag, a block identifier (block address) and a buffer address (or an offset within the buffer). The buffer address indicates the location in the UWB 2A in which the data to be written is stored. The write request may include a page address indicating the page to which data should be written. The controller 4 of the flash storage device 3 receives the write request, and holds the tag, the block identifier and the buffer address (or the offset within the buffer) included in the write request.

(3) When the flash programming controller 13 writes the data to the write destination block BLK, the controller 4 of the flash storage device 3 transmits a transfer request to the host 2. The transfer request includes the held buffer address (or offset within the buffer). Alternatively, the transfer request may include the held tag and the held buffer address (or offset within the buffer). Alternatively, the transfer request may include the held buffer address (or offset within the buffer) and the held block identifier (block address).

(4) When the transfer request including at least the buffer address (or offset within the buffer) is received, the flash storage manager of the host 2 transfers the data stored in the location in the UWB 2A specified by the buffer address (or offset within the buffer) from the UWB 2A to the flash storage device 3. For example, when the NAND flash memory 5 is a TLC-flash memory, data for three pages is transferred from the UWB 2A to the flash storage device 3. The transfer request may include the length of the data to be transferred.

(5) The controller 4 of the flash storage device 3 receives the data, transfers the data to the NAND flash memory 5 via the flash programming controller 13 and writes the data to the write destination block BLK. In a case where data for three pages is written to a physical page by full-sequence program operation, the flash programming controller 13 transfers the data for three pages in series to a group of page buffers in the NAND flash memory 5, and transmits a write instruction to the NAND flash memory 5. The flash programming controller 13 is capable of determining whether or not the write operation (full-sequence program operation) is finished by monitoring the status from the NAND flash memory 5.

(6) When the write operation is finished, and further when the data (here, the data for three pages) is readable, in other words, when the full-sequence program operation is successfully finished, the controller 4 notifies the host 2 that the data held in the UWB 2A (here, the data for three pages) is unnecessary. In this case, the controller 4 of the flash storage device 3 may transmit either a write completion (write done) including a tag, a page address and a length or an invalidate request to the host 2. The invalidate request includes the buffer address (or offset within the buffer) in which the readable data is stored. The invalidate request may include the tag of the readable data, and the buffer address (or offset within the buffer) in which the readable data is stored. When the full-sequence program operation for the last physical page of the write destination block BLK is finished, and the write destination block BLK is fully filled with data, the controller 4 notifies the host 2 that a UWB region corresponding to the write destination block BLK is unnecessary. In this case, the controller 4 transmits a close request to the host 2. The close request may include the block identifier (block address) of the write destination block BLK. When the close request including the block identifier of the write destination block BLK is received, the flash storage manager of the host 2 releases (frees) the UWB region associated with the write destination block BLK and uses the UWB region for another purpose. In this case, the flash storage manager may reuse the released UWB region as a UWB region for another write destination block (for example, a newly opened write destination block).

FIG. 7 shows an example of the relationship between a plurality of write destination blocks and a plurality of write buffer regions (UWB regions).

A write buffer region (UWB region #1) corresponding to write destination block BLK #1 may include, for example, a plurality of storage areas for temporarily storing data for a plurality of pages. In this case, each storage area may include a tag field, a valid/invalid field, a data storage field and a page address field. The tag field stores the tag of corresponding data. The valid/invalid field holds a valid/invalid flag indicating whether or not corresponding data needs to be held. The data storage field stores the data to be written to write destination block BLK #1. The data storage field may have a size for one page. The page address field is an optional field. When a write request includes a page address, the page address is stored in the page address field.

When the flash storage device 3 notifies the host 2 that a data unit stored in UWB region #1 is unnecessary, the host 2 (flash storage manager) changes a value of the valid/invalid flag in a storage area corresponding to the data unit to a value indicating invalidity. The storage area in which the valid/invalid flag is changed to a value indicating invalidity is reused to store another data unit to be written to the write destination block BLK #1.

The data structure of the UWB regions shown in FIG. 7 is merely an example. For example, data (write data) may be managed in each UWB region based on a size different from a page size.

FIG. 8 shows the relationship between the flash storage device 3 and the UWB 2A on the host side and a data read process performed by the host 2 and the flash storage device 3.

(1) In response to a request to read data from upper level software, the flash storage manager of the host 2 transmits a read request to read the data to the flash storage device 3. The read request may include, for example, a tag, a block identifier (block address), a page address and a length.

(2) When the write operation of the data specified by the read request to the write destination block BLK has already finished, and further when the data is readable, the controller 4 of the flash storage device 3 reads the data from the write destination block BLK via the flash programming controller 13.

(3) The controller 4 of the flash storage device 3 transmits the read data to the host 2 together with the tag of the data.

(3') When the data specified by the read request is not readable, in other words, when the read request to read the data is received from the host 2 in a period after the writing of the data is started until the data becomes readable, the controller 4 of the flash storage device 3 transmits, to the host 2, a transfer request to return the data from the UWB 2A as a response to the read request. The transfer request may include, as information for specifying the data in the UWB 2A to be returned, either a buffer address corresponding to the data or both a buffer address corresponding to the data and a block identifier corresponding to the data. Alternatively, the transfer request may include either a tag corresponding to the data or a block identifier corresponding to the data and a page address corresponding to the data.

(4') The flash storage manager of the host 2 reads the data from the UWB 2A and returns the read data to the upper level software together with the tag of the data.

Alternatively, until the flash storage device 3 notifies the host 2 that a data unit stored in the UWB 2A is unnecessary, the flash storage manager of the host 2 may directly read the data unit from the UWB 2A without transmitting a read request to the storage device 3 in response to a request to read the data unit from upper level software. In this case, a data read process is performed in the following manner.

(1") Until the flash storage device 3 notifies the host 2 that a data unit stored in the UWB 2A is unnecessary, the flash storage manager of the host 2 transmits a read request to the UWB 2A and reads the data unit from the UWB 2A in response to a request to read the data unit from upper level software. The read request may include, for example, a tag, a buffer address and a length.

(2″) The flash storage manager returns the data read from the UWB 2A to the upper level software together with the tag of the data.

FIG. 9 shows the relationship between a flash storage device 3 which supports foggy-fine writing and the UWB 2A on the host side and a process for writing data by the host 2 and the flash storage device 3.

It is assumed that write data is written to a single write destination block BLK by multi-step write operation (foggy-fine program operation).

(1) In the host 2, in response to a request to write data from upper level software, the flash storage manager stores, in the UWB 2A, the write request with the data to be written, a tag and a block identifier. The write request may include the length of the data to be written. When the write data to be written has a fixed length, the write request may not include the length. The write request may include a page address indicating the page to which data should be written. The upper level software may issue the write request. The flash storage manager may receive the write request from the upper level software and store the received write request in the UWB 2A.

(2) The flash storage manager transmits a write request (write command) to the flash storage device 3. The write request includes a tag, a block identifier (block address) and a buffer address (or an offset within the buffer). The write request may include a page address indicating the page to which data should be written. The controller 4 of the flash storage device 3 receives the write request, and holds the tag, the block identifier and the buffer address (or the offset within the buffer) included in the write request.

(3) When the flash programming controller 13 starts the first-step write operation (foggy writing) of the data, the controller 4 of the flash storage device 3 transmits a transfer request to the host 2. The transfer request includes the held buffer address (or offset within the buffer). Alternatively, the transfer request may include the held tag and the held buffer address (or offset within the buffer). Alternatively, the transfer request may include the held buffer address (or offset within the buffer) and the held block identifier (block address).

(4) When the transfer request including at least the buffer address (or offset within the buffer) is received, the flash storage manager of the host 2 transfers the data ("Foggy Data" in FIG. 9) stored in the location in the UWB 2A specified by the buffer address (or offset within the buffer) from the UWB 2A to the flash storage device 3. For example, when the NAND flash memory 5 is a TLC-flash memory, data for three pages is transferred from the UWB 2A to the flash storage device 3 as foggy data. The transfer request may include the length of the data to be transferred.

(5) The controller 4 of the flash storage device 3 receives the data, transfers the data to the NAND flash memory 5 via the flash programming controller 13 and writes the data to the write destination physical page of the write destination block BLK (the first-step writing: foggy writing). In a case where data for three pages is written to a write destination physical page by foggy writing, the flash programming controller 13 transfers the data for three pages in series to a group of page buffers in the NAND flash memory 5, and transmits a first-step write instruction to the NAND flash memory 5. The flash programming controller 13 is capable of determining whether or not the write operation (the first-step write operation) is finished by monitoring the status from the NAND flash memory 5. Normally, to reduce the program disturbs, foggy-fine program operation is performed while reciprocating between a plurality of word lines (a plurality of physical pages) like the foggy writing of physical page #1, the foggy writing of physical page #2, the fine writing of physical page #1 and the fine writing of physical page #2.

(6) When the time has come to perform the second-step writing (fine writing) to the write destination physical page, the controller 4 of the flash storage device 3 transmits a transfer request to the host 2 again to obtain the data to be written by fine writing (in other words, the same data as the data written by foggy writing). The transfer request includes the held buffer address, in other words, the same buffer address as the buffer address included in the transfer request transmitted in process (3).

(7) When the transfer request including at least the buffer address (or offset within the buffer) is received, the flash storage manager of the host 2 transfers the data ("Fine Data" in FIG. 9) stored in the location in the UWB 2A specified by the buffer address (or offset within the buffer) from the UWB 2A to the flash storage device 3. The fine data is the same as the foggy data. For example, when the NAND flash memory 5 is a TLC-flash memory, the data for three pages is transferred from the UWB 2A to the flash storage device 3 as fine data. The transfer request may include the length of the data to be transferred. The host 2 does not need to recognize that the data to be transferred is foggy data or fine data.

(8) The controller 4 of the flash storage device 3 receives the data, transfers the data to the NAND flash memory 5 via the flash programming controller 13 and writes the data to the write destination physical page of the write destination block BLK (the second-step writing: fine writing). In a case where data for three pages is written to the write destination physical page by fine writing, the flash programming controller 13 transfers the same data for three pages as the data for three pages used in foggy writing in series to a group of page buffers in the NAND flash memory 5, and transmits a second-step write instruction to the NAND flash memory 5. The flash programming controller 13 is capable of determining whether or not the write operation (the second-step write operation) is finished by monitoring the status from the NAND flash memory 5.

(9) When the second-step write operation is finished, and further when the data (here, the data for three pages) is readable, in other words, when all the foggy-fine program operation is successfully finished, the controller 4 notifies the host 2 that the data held in the UWB 2A (here, the data for three pages) is unnecessary. In this case, the controller 4 of the flash storage device 3 may transmit either a write completion (write done) including a tag, a page address and a length or an invalidate request to the host 2. The invalidate request includes the buffer address (or offset within the buffer) in which the readable data is stored. The invalidate request may include the tag of the readable data, and the buffer address (or offset within the buffer) in which the readable data is stored. When the foggy-fine program operation for the last physical page of the write destination block BLK is finished, and the write destination block BLK is fully filled with data, the controller 4 notifies the host 2 that a UWB region corresponding to the write destination block BLK is unnecessary. In this case, the controller 4 transmits a close request to the host 2. The close request may include the block identifier (block address) of the write destination block BLK. When the close request including the block identifier of the write destination block BLK is received, the flash storage manager of the host 2 releases the UWB region associated with the write destination block BLK and uses the UWB region for another purpose. In this case, the flash storage manager may reuse the released UWB region as a UWB region for another write destination block (for example, a newly opened write destination block).

FIG. 10 shows the relationship between a flash storage device 3 which supports foggy-fine writing and the UWB 2A on the host side and a data read process performed by the host 2 and the flash storage device 3.

(1) In response to a request to read data from upper level software, the flash storage manager of the host 2 transmits a read request to read the data to the flash storage device 3. The read request may include, for example, a tag, a block identifier (block address), a page address and a length.

(2) When the write operation of the data specified by the read request to the write destination block BLK has already finished, and further when the data is readable, in other words, when both the foggy writing of the data and the fine writing of the data have finished, the controller 4 of the flash storage device 3 reads the data from the write destination block BLK via the flash programming controller 13.

(3) The controller 4 of the flash storage device 3 transmits the read data to the host 2 together with the tag of the data.

(3') When the data specified by the read request is not readable, in other words, when the read request to read the data is received from the host 2 in a period after the writing of the data is started until the data becomes readable, the controller 4 of the flash storage device 3 transmits, to the host 2, a transfer request to return the data from the UWB 2A as a response to the read request. The transfer request may include a buffer address corresponding to the data.

(4') The flash storage manager of the host 2 reads the data from the UWB 2A and returns the read data to the upper level software together with the tag of the data.

Alternatively, until the flash storage device 3 notifies the host 2 that a data unit stored in the UWB 2A is unnecessary, the flash storage manager of the host 2 may directly read the data unit from the UWB 2A without transmitting a read request to the storage device 3 in response to a request to read the data unit from upper level software. In this case, a data read process is performed in the following manner.

(1'') Until the flash storage device 3 notifies the host 2 that a data unit stored in the UWB 2A is unnecessary, the flash storage manager of the host 2 transmits a read request to the UWB 2A and reads the data unit from the UWB 2A in response to a request to read the data unit from upper level software. The read request may include, for example, a tag, a buffer address and a length.

(2'') The flash storage manager returns the data read from the UWB 2A to the upper level software together with the tag of the data.

Figure 11:
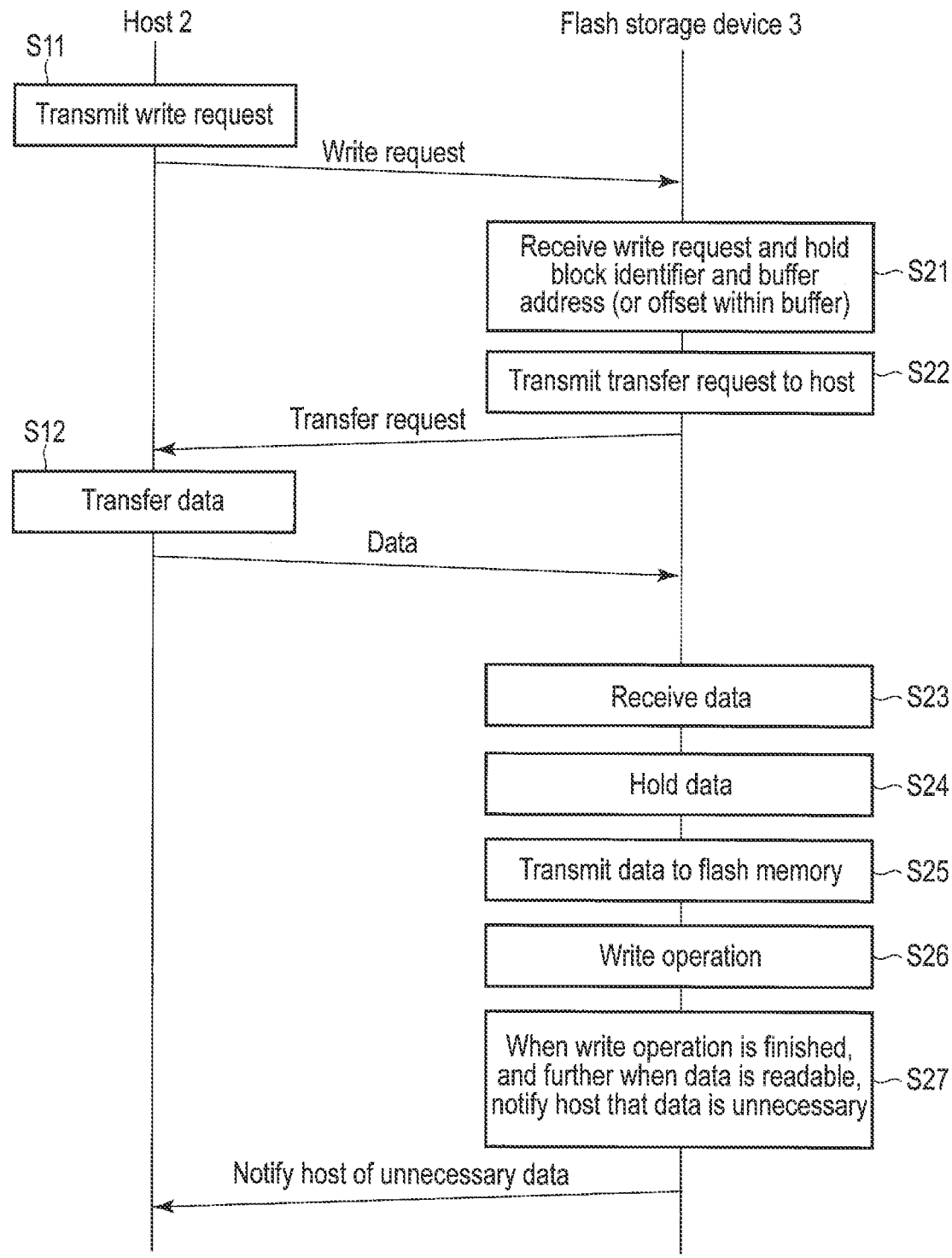
FIG. 11 is a sequence diagram showing a procedure of a data write process performed by the host and the flash storage device.

The sequence chart of FIG. 11 shows the procedure of a data writing process performed by the host 2 and the flash storage device 3.

The host 2 stores the data (write data) to be written to a write destination block in the UWB region associated with the write destination block, and transmits a write request including a block identifier and a buffer address (or an offset within the buffer) to the flash storage device 3 (step S11). The block identifier is the block address of the write destination block to which the write data should be written. The buffer address indicates the location in the UWB region in which the write data is stored.

The controller 4 of the flash storage device 3 receives the write request from the host 2, and holds the block identifier and the buffer address (or offset within the buffer) included in the write request (step S21). In this case, the controller 4 may hold the block identifier and the buffer address by storing the block identifier and the buffer address in the write buffer 31 on the DRAM 6.

When write data corresponding to the write request is to be written to the write destination block specified by the held block identifier, the controller 4 of the flash storage device 3 transmits a transfer request including the held buffer address (or offset within the buffer) to the host 2 (step S22).

When the host 2 receives the transfer request, the host 2 transfers the write data from the UWB region to the flash storage device 3 (step S12).

The controller 4 of the flash storage device 3 receives the write data transferred from the host 2 (step S23). The controller 4 holds the received write data by storing it in, for example, the write buffer 31 on the DRAM 6 (step S24).

The controller 4 transfers the received write data to the NAND flash memory 5 (step S25). Until the transfer of the write data to the NAND flash memory 5 is finished, the controller 4 holds the write data. The controller 4 writes the write data to the write destination block specified by the held block identifier (step S26). In this case, a write destination page in the write destination block to which the write data should be written is determined by the controller 4. The write request may include a page address specifying the write destination page.

When the write operation of the write data is finished, and further when the write data is readable (in full-sequence program operation, when full-sequence program operation is finished), the controller 4 notifies the host 2 that the write data stored in the UWB region is unnecessary (step S27).

The flowchart of FIG. 12 shows the procedure of a notification process performed by the flash storage device 3.

The controller 4 of the flash storage device 3 determines whether or not the write operation of data to the write destination block is finished and whether or not the data is readable (step S31).

When the write operation of data is finished, and further when the data is readable (YES in step S31), the controller 4 determines whether or not the write operation to the last page (physical page) of the write destination block is finished and whether or not the write destination block is fully filled with data (step S32).

When an available physical page (unwritten physical page) remains in the write destination block (NO in step S32), the controller 4 transmits a write done or an invalidate request to the host 2 to notify the host 2 that the readable data held in the UWB region is unnecessary (step S33).

When the write operation to the last page (physical page) of the write destination block is finished, and the write destination block is fully filled with data (YES in step S32), the controller 4 transmits a close request to the host 2 to notify the host 2 that the entire UWB region corresponding to the write destination block is unnecessary (step S34).

Figure 13:
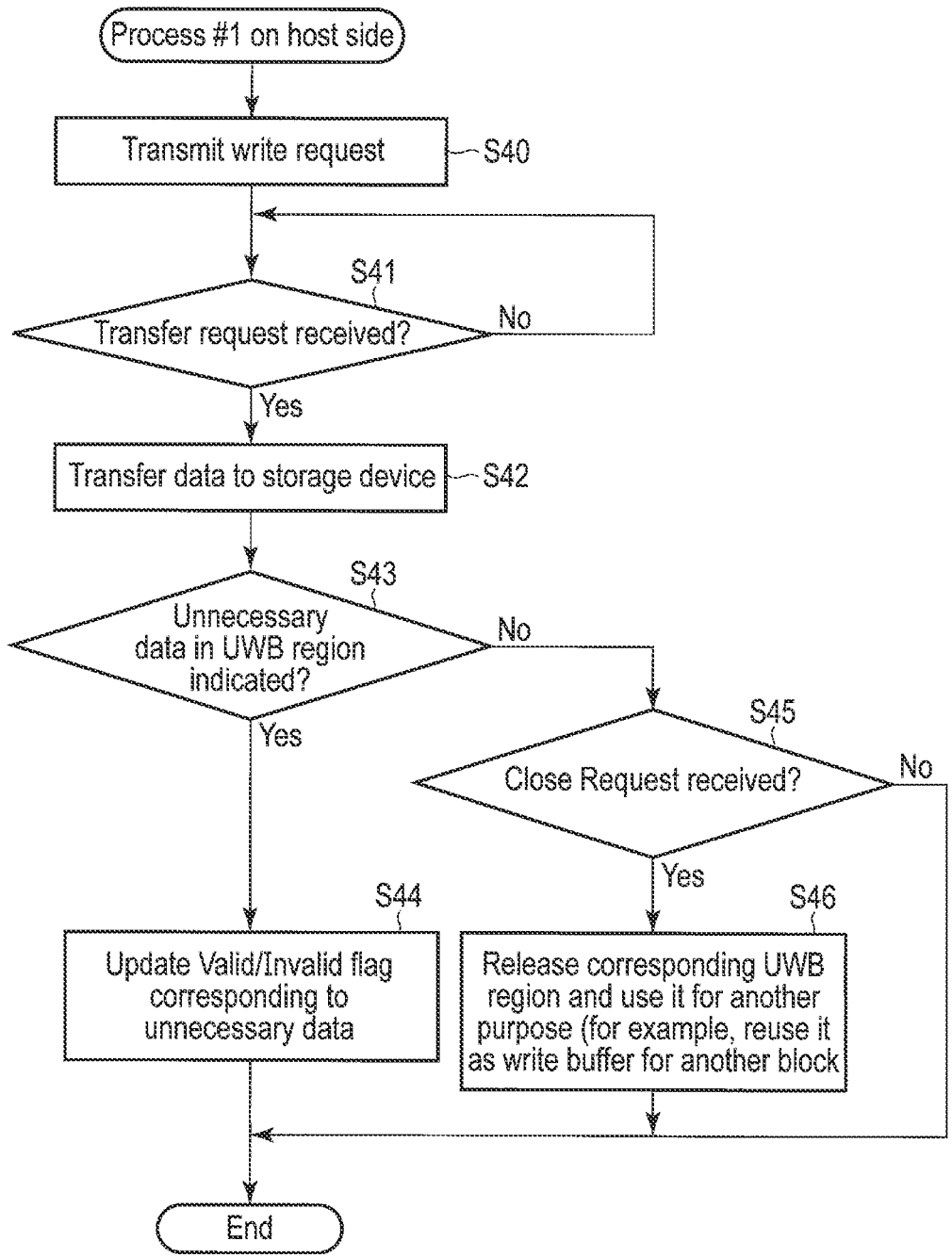
FIG. 13 is a flowchart showing a procedure of a process performed on the host side based on the reception of a transfer request.

The flowchart of FIG. 13 shows the procedure of a process performed on the host side based on the reception of a transfer request.

The host 2 transmits a write request including a block identifier and a buffer address (or an offset within the buffer) to the flash storage device 3 (step S40). The host 2 determines whether or not a transfer request is received from the flash storage device 3 (step S41).

When a transfer request is received from the flash storage device 3 (YES in step S41), the host 2 transmits, to the flash storage device 3, the data stored in the location in the UWB region specified by the buffer address (or offset within the buffer) included in the transfer request (step S42). The host 2 determines whether or not unnecessary data in the UWB region is indicated by the flash storage device 3, or whether or not a close request is received from the flash storage device 3 (steps S43 and S44).

When unnecessary data in the UWB region is indicated by the flash storage device 3 (YES in step S43), the host 2 updates a valid/invalid flag corresponding to the unnecessary data with a value indicating invalidity, and releases (frees) the storage area in the UWB region in which the unnecessary data is stored (step S44). The host 2 is capable of reusing the released storage area as a storage area for the new write data to be written to the write destination block corresponding to the UWB region.

In the present embodiment, when the write operation of a data unit is finished, and the data unit is readable, the flash storage device 3 notifies the host 2 that the data unit in the UWB region is unnecessary. Until the data unit becomes readable from the NAND flash memory 5, the data unit is held in the UWB region.

When a close request is received from the flash storage device 3 (YES in step S45), the host 2 releases the entire UWB region associated with the write destination block having the block identifier included in the close request (step S46). The host 2 is capable of reusing the released UWB region as a UWB region for a write destination block newly allocated by the flash storage device 3.

Figure 14:
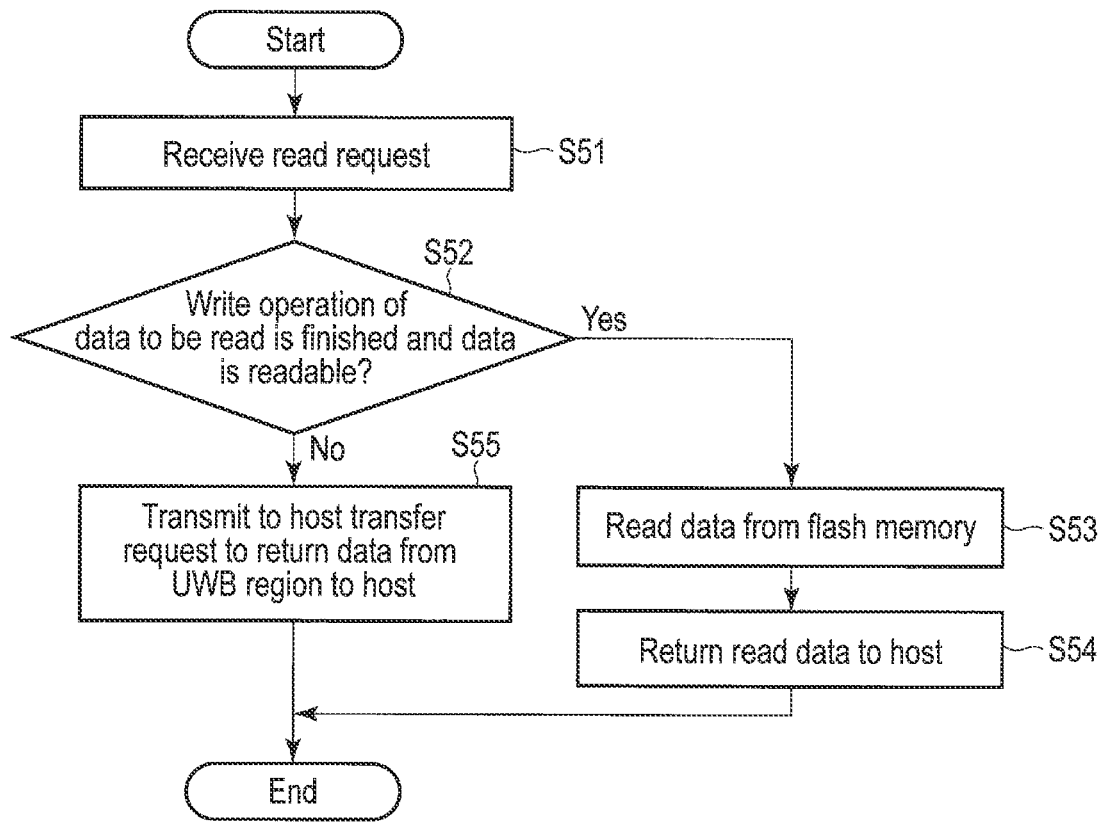
FIG. 14 is a flowchart showing a procedure of data read operation performed by the flash storage device based on the reception of a read request.

The flowchart of FIG. 14 shows the procedure of data read operation performed by the flash storage device 3 based on the reception of a read request.

The controller 4 of the flash storage device 3 receives a read request from the host 2 (step S51). The controller 4 determines whether or not the write operation of the data to be read specified by the read request to the write destination block is finished and whether or not the data is readable (step S52).

If the write operation of the data to be read to the write destination block is finished, and further when the data is readable (YES in step S52), the controller 4 reads the data to be read from the NAND flash memory (step S53) and returns the read data to the host 2 (step S54).

If the write operation of the data to be read is not finished and the data is not readable, in other words, when a read request for the data is received from the host 2 in a period after the writing of the data is started until the data becomes readable (NO in step S52), the controller 4 transmits, to the host 2, a transfer request to return the data from the UWB region as a response to the read request (step S55).

Figure 15:
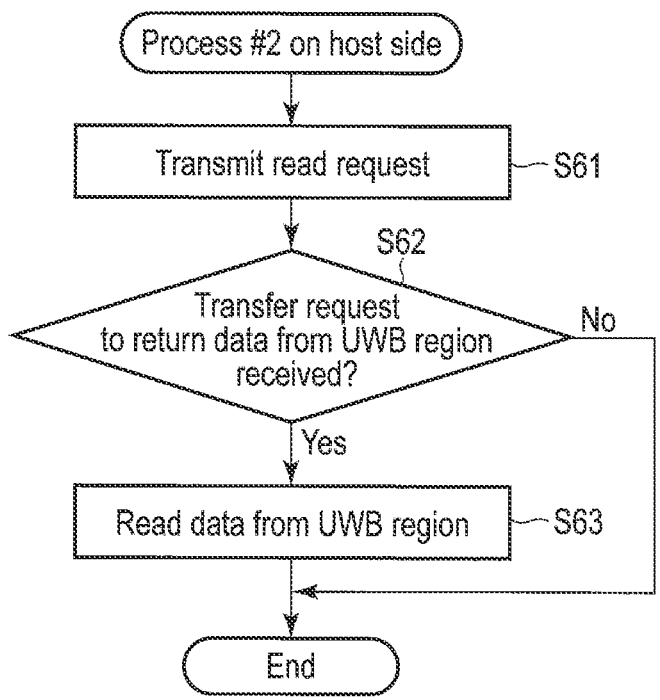
FIG. 15 is a flowchart showing a procedure of a process performed on the host side for reading data.

The flowchart of FIG. 15 shows the procedure of a process performed on the host side for reading data.

Regardless of whether or not the data to be read is present in a UWB region, the host 2 transmits a read request to read the data to the flash storage device 3 (step S61).

The host 2 determines whether or not a transfer request to return (read) the data from the UWB region is received from the flash storage device 3 (step S62).

When the transfer request is received from the flash storage device 3 (YES in step S62), the host 2 reads the data from the UWB region (step S63).

FIG. 16 shows the relationship between a flash storage device 3 which supports stream writing and the UWB 2A on the host side and a process for writing data by the host 2 and the flash storage device 3.

It is assumed that write data is written to one write destination block BLK by full-sequence program operation.

(1) In the host 2, in response to a request to write data from upper level software (an application program or a file system), the flash storage manager stores, in the UWB 2A, a write request including the data to be written, a stream ID, an LBA and a length. The stream ID is the identifier of one of the streams associated with a plurality of write destination blocks. The upper level software may issue the write request. The flash storage manager may receive the write request from the upper level software and store the received write request in the UWB 2A.

(2) The flash storage manager transmits a write request (write command) to the flash storage device 3. The write request includes a stream ID, an LBA, a length and a buffer address (or an offset within the buffer). The buffer address indicates the location in the UWB 2A in which the data to be written is stored. The controller 4 of the flash storage device 3 receives the write request and holds the stream ID, the LBA, the length and the buffer address included in the write request.

(3) When the flash programming controller 13 should write the data to the write destination block BLK, the controller 4 of the flash storage device 3 transmits a transfer request to the host 2. The transfer request includes the held buffer address (or offset within the buffer). Alternatively, the transfer request may include the held LBA and the held buffer address (or offset within the buffer). Alternatively, the transfer request may include the held buffer address (or offset within the buffer) and the held stream ID. Alternatively, the transfer request may include the held buffer address (or offset within the buffer) and the block identifier (block address) of the write destination block associated with the held stream ID.

(4) When the transfer request including at least the buffer address (or offset within the buffer) is received, the flash storage manager of the host 2 transfers the data stored in the location in the UWB 2A specified by the buffer address (or offset within the buffer) from the UWB 2A to the flash storage device 3. For example, when the NAND flash memory 5 is a TLC-flash memory, data for three pages is transferred from the UWB 2A to the flash storage device 3. The transfer request may include the length of the data to be transferred.

(5) The controller 4 of the flash storage device 3 receives the data, transfers the data to the NAND flash memory 5 via the flash programming controller 13 and writes the data to the write destination block BLK. In a case where data for three pages is written to a physical page by full-sequence program operation, the flash programming controller 13 transfers the data for three pages in series to a group of page buffers in the NAND flash memory 5, and transmits a write instruction to the NAND flash memory 5. The flash programming controller 13 is capable of determining whether or not the write operation (full-sequence program operation) is finished by monitoring the status from the NAND flash memory 5.

(6) When the write operation is finished, and further when the data (here, the data for three pages) is readable, in other words, when the full-sequence program operation is successfully finished, the controller 4 notifies the host 2 that the data held in the UWB 2A (here, the data for three pages) is unnecessary. In this case, the controller 4 of the flash storage device 3 may transmit either a write done including an LBA and a length or an invalidate request to the host 2. The invalidate request includes the buffer address (or offset within the buffer) in which the readable data is stored. Alternatively, the invalidate request may include the LBA of the readable data and the buffer address (or offset within the buffer) in which the readable data is stored. When the full-sequence program operation for the last physical page of the write destination block BLK is finished, and the write destination block BLK is fully filled with data, the controller 4 notifies the host 2 that a UWB region corresponding to the write destination block BLK is unnecessary. In this case, the controller 4 transmits a close request to the host 2. The close request may include the block identifier (block address) of the write destination block BLK. When the close request including the block identifier of the write destination block BLK is received, the flash storage manager of the host 2 releases the UWB region associated with the write destination block BLK and uses the UWB region for another purpose. In this case, the flash storage manager may reuse the released UWB region as a UWB region for another write destination block (for example, a newly opened write destination block).

FIG. 17 shows the relationship between a plurality of stream IDs and a plurality of write destination blocks associated with the stream IDs.

FIG. 17 exemplarily shows the following case. Write destination block BLK #1 is associated with the stream of stream ID #1. Write destination block BLK #2 is associated with the stream of stream ID #2. Write destination block BLK #3 is associated with the stream of stream ID #3. Write destination block BLK #n is associated with the stream of stream ID #n.

The write data specified by a write request including stream ID #1 is written to write destination block BLK #1. The write data specified by a write request including stream ID #2 is written to write destination block BLK #2. The write data specified by a write request including stream ID #3 is written to write destination block BLK #3. The write data specified by a write request including stream ID #n is written to write destination block BLK #n.

FIG. 18 shows the relationship between a flash storage device 3 which supports stream writing and the UWB 2A on the host side and a process for reading data by the host 2 and the flash storage device 3.

(1) In response to a request to read data from upper level software, the flash storage manager of the host 2 transmits a read request to read the data to the flash storage device 3. The read request may include, for example, an LBA and a length.

(2) When the write operation of the data specified by the read request to the write destination block BLK has already finished, and further when the data is readable, the controller 4 of the flash storage device 3 reads the data from the write destination block BLK via the flash programming controller 13.

(3) The controller 4 of the flash storage device 3 transmits the read data to the host 2 together with the LBA of the data.

(3') When the data specified by the read request is not readable, in other words, when a read request to read the data is received from the host 2 in a period after the writing of the data is started until the data becomes readable, the controller 4 of the flash storage device 3 transmits, to the host 2, a transfer request to return the data from the UWB 2A as a response to the read request. The transfer request may include a buffer address corresponding to the data.

(4') The flash storage manager of the host 2 reads the data from the UWB 2A and returns the read data to the upper level software together with the LBA of the data.

Alternatively, until the flash storage device 3 notifies the host 2 that a data unit stored in the UWB 2A is unnecessary, the flash storage manager of the host 2 may directly read the data unit from the UWB 2A without transmitting a read request to the storage device 3 in response to a request to read the data unit from upper level software. In this case, a data read process is performed in the following manner.

(1") Until the flash storage device 3 notifies the host 2 that a data unit stored in the UWB 2A is unnecessary, the flash storage manager of the host 2 transmits a read request to the UWB 2A and reads the data unit from the UWB 2A in response to a request to read the data unit from upper level software. The read request may include, for example, an LBA and a length.

(2") The flash storage manager returns the data read from the UWB 2A to the upper level software together with the LBA of the data.

The sequence diagram of FIG. 19 shows the procedure of a process for writing data by a flash storage device 3 which supports foggy-fine writing and the host 2.

This specification exemplarily explains a case where a write request includes a block identifier and a buffer address (or an offset within the buffer).

The host 2 stores the data (write data) to be written to a write destination block to the UWB region associated with the write destination block, and transmits a write request including a block identifier and a buffer address (or an offset within the buffer) to the flash storage device 3 (step S71). The block identifier is the block address of the write destination block to which the write data should be written. The buffer address indicates the location in the UWB region in which the write data is stored.

The controller 4 of the flash storage device 3 receives the write request from the host 2, and holds the block identifier and the buffer address (or offset within the buffer) included in the write request (step S81). In this case, the controller 4 may hold the block identifier and the buffer address by storing the block identifier and the buffer address in the write buffer 31 on the DRAM 6.

When write data corresponding to the write request is to be written to the write destination block specified by the held block identifier by multi-step program operation (foggy-fine program operation), the controller 4 of the flash storage device 3 transmits, to the host 2, a transfer request including the held buffer address (or offset within the buffer) to obtain the write data (foggy data) used for foggy writing from the UWB region (step S82).

When the host 2 receives the transfer request, the host 2 transfers the write data from the UWB region to the flash storage device 3 (step S72).

The controller 4 of the flash storage device 3 receives the write data transferred from the host 2 as foggy data (step S83). The controller 4 holds the received write data (foggy data) by storing it in, for example, the write buffer 31 of the DRAM 6 (step S84).

The controller 4 transfers the received write data (foggy data) to the NAND flash memory 5 (step S85). Until the transfer of the write data (foggy data) to the NAND flash memory 5 is finished, the controller 4 holds the write data (foggy data). The controller 4 writes the write data (foggy data) to the write destination physical page of the write destination block specified by the held block identifier (the first-step writing: foggy writing) (step S86).

Subsequently, when the time has come to perform the second-step writing (fine writing) to the write destination physical page, the controller 4 of the flash storage device 3 transmits a transfer request including the held buffer address (or offset within the buffer) to the host 2 again to obtain the write data used for fine writing (fine data) from the UWB region (step S87). The fine data is the same as the foggy data.

When the host 2 receives the transfer request, the host 2 transfers the write data from the UWB region to the flash storage device 3 (step S73).

The controller 4 of the flash storage device 3 receives the write data transferred from the host 2 as fine data (step S88). The controller 4 holds the received write data (fine data) by storing it in, for example, the write buffer 31 on the DRAM 6 (step S89).

The controller 4 transfers the received write data (fine data) to the NAND flash memory 5 (step S90). Until the transfer of the write data (fine data) to the NAND flash memory 5 is finished, the controller 4 holds the write data (fine data). The controller 4 writes the write data (fine data) to the write destination physical page of the write destination block (the second-step writing: fine writing) (step S91).

When the write operation is finished, and further when the write data is readable (in other words, when both foggy write operation and fine write operation are finished), the controller 4 notifies the host 2 that the write data stored in the UWB region is unnecessary (step S92).

Figure 20:
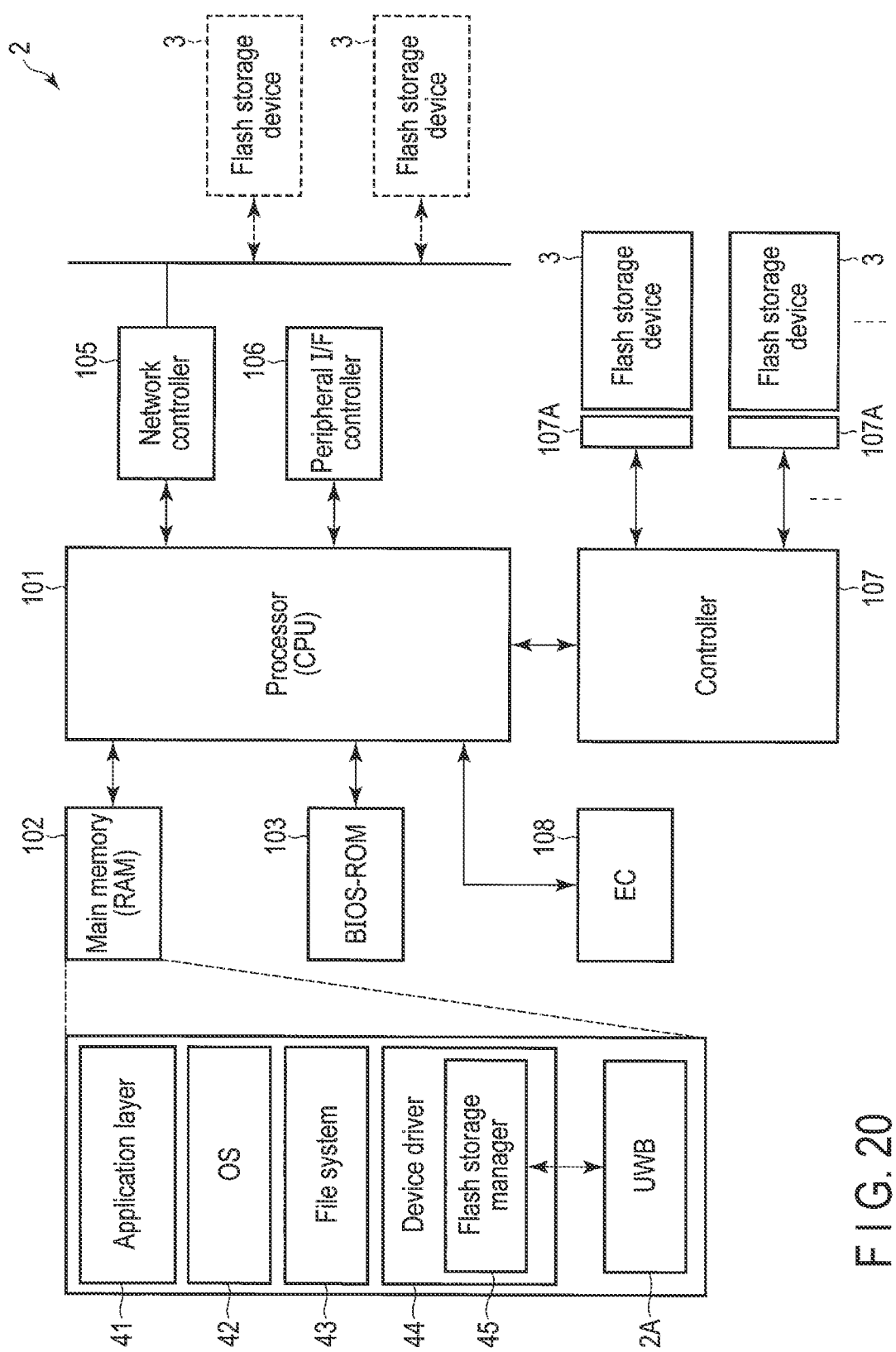
FIG. 20 is a block diagram showing a configuration example of the host.

FIG. 20 shows a configuration example of the host 2 (information processing apparatus).

The host 2 includes a processor (CPU) 101, a main memory 102, a BIOS-ROM 103, a network controller 105, a peripheral interface controller 106, a controller 107, an embedded controller (EC) 108, etc.

The processor 101 is a CPU configured to control the operation of each component included in the information processing apparatus. The processor 101 executes various programs on the main memory 102. The main memory 102 is structured by a random access memory such as a DRAM. The programs executed by the processor 101 include, for example, an application software layer 41, an operating system (OS) 42, a file system 43 and a device driver 44.

Various application programs run on the application software layer 41. As is commonly known, the OS 42 is software configured to manage the whole information processing apparatus, control hardware in the information processing apparatus and perform control for allowing software to use hardware and the flash storage device 3. The file system 43 is used to control the operation of files (for example, creating, storing, updating and erasing).

The device driver 44 is a program for controlling and managing the flash storage device 3. The device driver 44 includes the above flash storage manager. The flash storage manager 45 includes, for example, instructions for managing the UWB 2A on the main memory 102, instructions for transmitting a write request, a read request, etc., to the flash storage device 3, instructions for transferring data from the UWB 2A to the flash storage device 3 every time a transfer request is received from the flash storage device 3, and instructions for reading a data unit stored in the UWB 2A from the UWB 2A until information indicating that the data unit is unnecessary is indicated by the flash storage device 3. The processor 101 performs a process for writing data, a process for reading data, a process for releasing a UWB region, etc., by executing a group of instructions of the flash storage manager 45 provided in the device driver 44.

The network controller 105 is a communication device such as an Ethernet controller. The peripheral interface controller 106 is configured to perform communication with a peripheral device such as a USB device.

The controller 107 is configured to perform communication with the devices connected to a plurality of connectors 107A. In the present embodiment, a plurality of flash storage devices 3 may be connected to the connectors 107A, respectively. The controller 107 may be an SAS expander, a PCIe switch, a PCIe expander, a flash-array controller or a RAID controller. Alternatively, a plurality of flash storage devices 3 may be connected to the network controller 105 via Ethernet.

Figure 21:
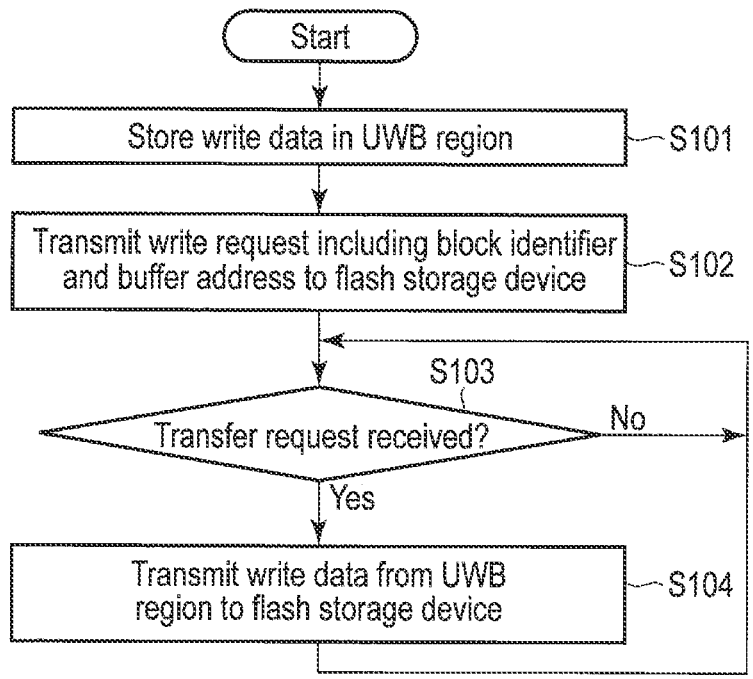
FIG. 21 is a flowchart showing a procedure of a data write process performed by a processor (CPU) in the host.

The flowchart of FIG. 21 shows the procedure of a process for writing data by the processor 101.

In a process for writing data, the processor 101 stores the write data to be written to one write destination block of the NAND flash memory 5 in the UWB 2A (a UWB region corresponding to the write destination block) (step S101). The processor 101 transmits, to the flash storage device 3, a write request including an identifier associated with the write destination block and storage location information indicating the location in the UWB 2A (in other words, the location in the UWB region) in which the write data is stored (step S102). The identifier associated with the write destination block may be, as described above, the block identifier (block address) of the write destination block. The storage location information may be, as described above, a buffer address (or an offset within the buffer). In this case, the processor 101 may transmit, to the flash storage device 3, a write request including a tag, a block identifier and a buffer address (or an offset within the buffer). When the host 2 specifies a page as well as a block, the write request may include a tag, a block identifier (block address), a page address and a buffer address (or an offset within the buffer).

When stream writing is used, a stream ID may be used instead of the block identifier (block address). In this case, the write request may include a stream ID, an LBA and a buffer address (or an offset within the buffer).

After the processor 101 transmits the write request to the flash storage device 3, the processor 101 transfers the write data from the UWB 2A (UWB region) to the flash storage device 3 every time a transfer request including a buffer address (or an offset within the buffer) is received from the flash storage device 3 (steps S103 and S104). More specifically, the processor 101 determines whether or not a transfer request including a buffer address (or an offset within the buffer) is received from the flash storage device 3 (step S103). When a transfer request is received from the flash storage device 3 (YES in step S103), the processor 101 transfers the write data from the UWB 2A (UWB region) to the flash storage device 3.

As described above, when write data is written to a write destination block by multi-step program operation (foggy-fine program operation), the processor 101 receives a transfer request including the same buffer address (or the same offset within the buffer) from the flash storage device 3 a plurality of times. Every time a transfer request is received, the processor 101 transfers the write data from the UWB 2A (UWB region) to the flash storage device 3.

Figure 22:
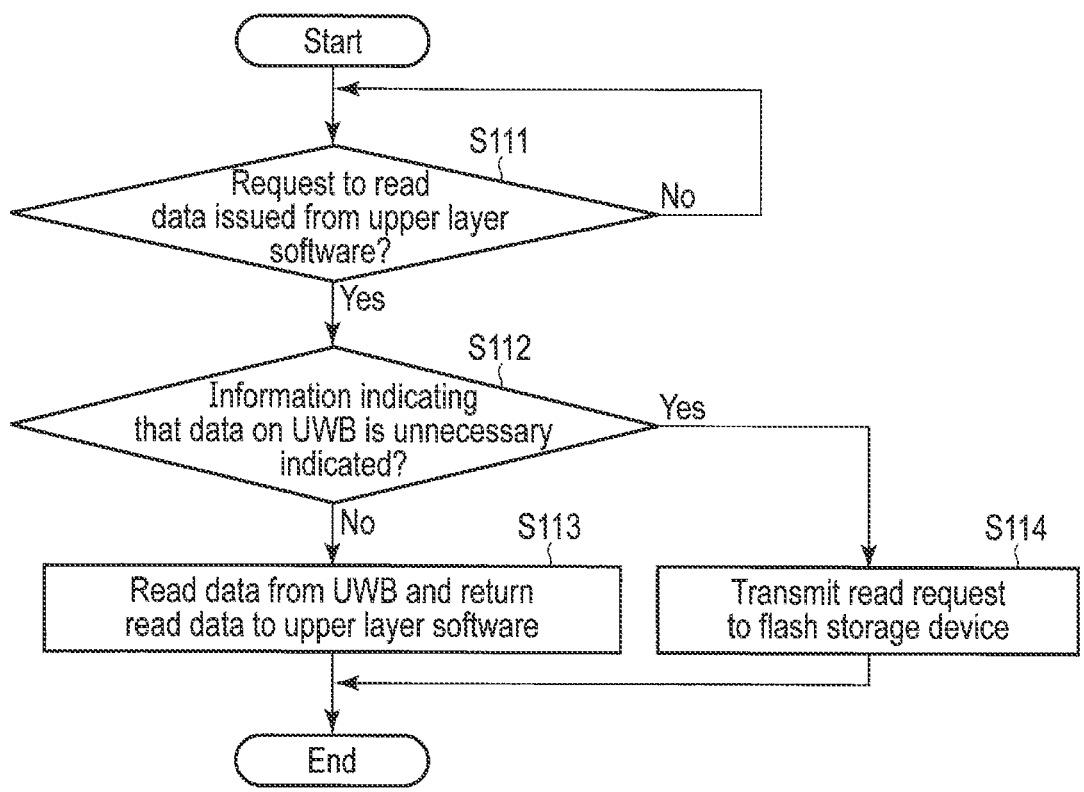
FIG. 22 is a flowchart showing a procedure of a data read process performed by the processor in the host.

The flowchart of FIG. 22 shows the procedure of a process for reading data by the processor 101.

Until the flash storage device 3 notifies the host 2 that data stored in the UWB 2A (UWB region) is unnecessary, the processor 101 reads the data from the UWB 2A (UWB region) in response to a request to read the data from upper level software, and returns the read data to the upper level software.

When a request to read data is issued from upper level software (YES in step S111), the processor 101 determines whether or not information indicating that the data on the UWB 2A (UWB region) is unnecessary is indicated by the flash storage device 3 (step S112).

When information indicating that the data is unnecessary is not indicated yet (NO in step S112), the processor 101 reads the data from the UWB 2A (UWB region), and returns the read data to the upper level software (step S112).

When information indicating that the data is unnecessary is indicated (YES in step S112), the processor 101 transmits a read request to read the data to the flash storage device 3, and reads the data from the flash storage device 3 (step S114).

Figure 23:
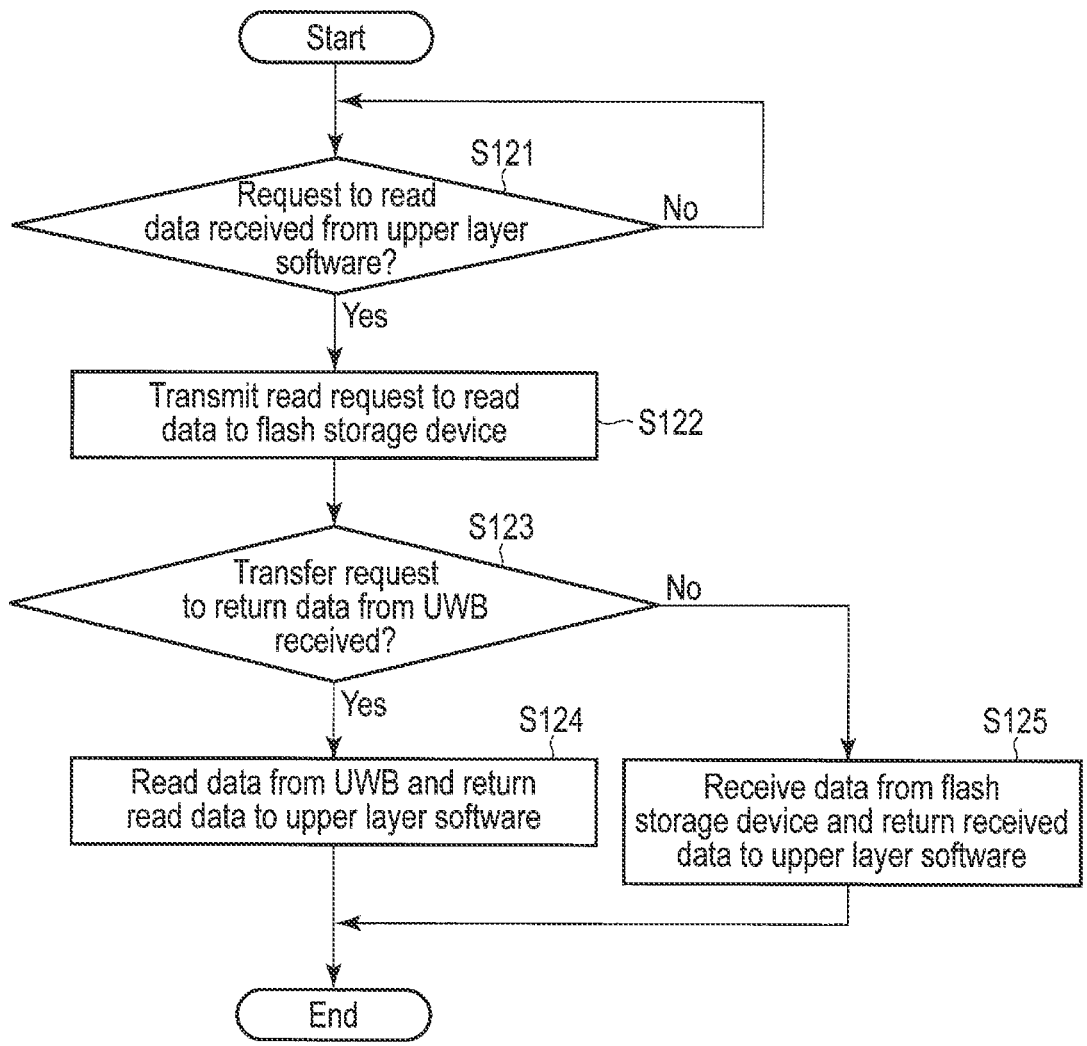
FIG. 23 is a flowchart showing another procedure of a data read process performed by the processor in the host.

The flowchart of FIG. 23 shows another procedure of a process for reading data by the processor 101.

When a request to read data is received from upper level software (YES in step S121), the processor 101 transmits a read request to read the data to the flash storage device 3 regardless of whether the data is present in the UWB 2A (UWB region), in other words, regardless of whether information indicating that the data is unnecessary is indicated by the flash storage device 3 (step S122).

When the data specified by the read request is not readable yet, the flash storage device 3 transmits, to the host 2, a transfer request to return the data from the UWB 2A (UWB region).

When a transfer request is received from the flash storage device 3 (YES in step S123), the processor 101 reads the data from the UWB 2A (UWB region), and returns the read data to the upper level software (step S124).

When a transfer request is not received from the flash storage device 3 (NO in step S123), the processor 101 receives the data returned from the flash storage device 3 as a response to the read request, and returns the data to the upper level software (step S125).

Figure 24:
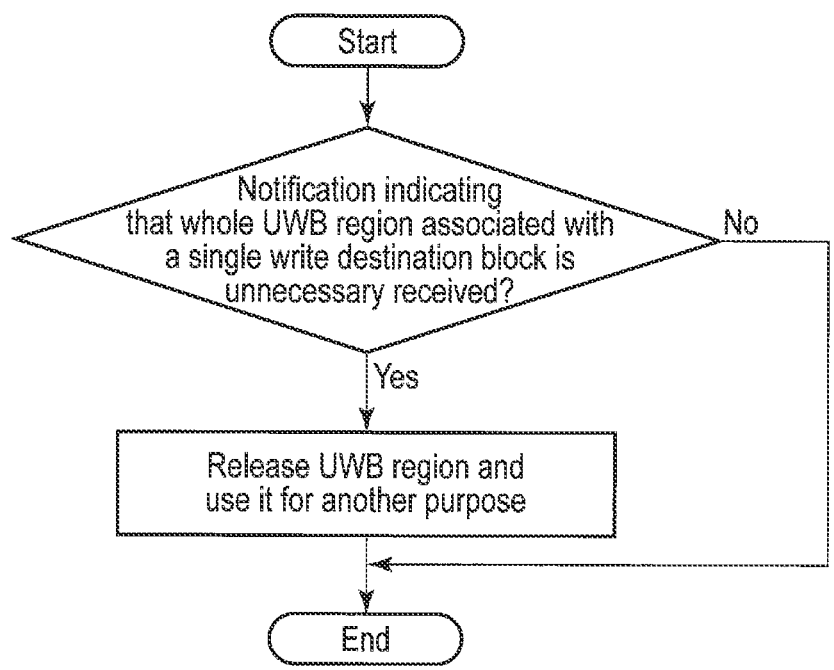
FIG. 24 is a flowchart showing a procedure of a process for releasing a UWB region, which is performed by the processor in the host.

The flowchart of FIG. 24 shows the procedure of a process for releasing a UWB region by the processor 101.

When the processor 101 receives a notification (close request) indicating that the whole UWB region associated with one write destination block is unnecessary from the flash storage device 3 (YES in step S131), the processor 101 releases the whole UWB region (step S132). In step S132, the processor 101 is capable of using a memory space corresponding to the released UWB region for another arbitrary purpose. For example, the processor 101 may reuse the released UWB region as the UWB region associated with the write destination block newly allocated by the controller 4 of the flash storage device 3. When data needs to be written to the newly allocated write destination block, the processor 101 stores the data in the UWB region associated with the newly allocated write destination block, and transmits, to the flash storage device 3, a write request including the identifier (the block identifier or the stream ID) associated with the newly allocated write destination block and storage location information (for example, a buffer address) indicating the location in the UWB region in which the data is stored.

As explained above, in the present embodiment, the controller 4 of the flash storage device 3 receives, from the host 2, a write request including a first identifier (a block identifier or a stream ID) associated with one write destination block and storage location information (a buffer address or an offset within the buffer) indicating the location in the write buffer (UWB 2A) on the memory of the host 2 in which the first data to be written is stored. When the first data is written to the NAND flash memory 5, the controller 4 obtains the first data from the write buffer (UWB 2A) by transmitting a transfer request including storage location information to the host 2. In this way, data necessary for write operation can be obtained from the write buffer (UWB 2A) of the host 2. Thus, it is possible to increase the number of write destination blocks which can be used at the same time without preparing a large number of write buffers in the flash storage device 3. The number of end users sharing the flash storage device 3 can be easily increased without increasing the cost of the flash storage device 3.

When the writing of the first data is finished, and further when the first data is readable from the NAND flash memory 5, the controller 4 notifies the host 2 that the first data held in the write buffer (UWB 2A) is unnecessary. In response to this notification, the host 2 is capable of discarding the data if necessary. Until the data to be written becomes readable from the NAND flash memory 5, the controller 4 is capable of repeatedly obtaining the data from the write buffer (UWB 2A) depending on the need. Even when multi-step program operation such as foggy-fine program operation is performed, the controller 4 is capable of obtaining necessary data from the write buffer (UWB 2A) every time each step of the multi-step program operation for transferring the data is started.

In the present embodiment, a NAND flash memory is exemplarily shown as a nonvolatile memory. However, the function of the present embodiment may be applied to various other nonvolatile memories such as a magnetoresistive random access memory (MRAM), a phase change random access memory (PRAM), a resistive random access memory (ReRAM) or a ferroelectric random access memory (FeRAM).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, comprising:
a nonvolatile memory; and
a controller electrically connected to the nonvolatile memory and configured to:

receive, from the host, a first write request that includes storage location information indicating a first location of a write buffer on a memory of the host as a transfer source of first data;
at a first timing, transfer the first data from the first location of the write buffer of the host to the nonvolatile memory by transmitting, to the host, a transfer request that includes information indicating the first location of the write buffer of the host; and
at a fifth timing after the first timing, without receiving the first write request again, transfer the first data again from the first location of the write buffer of the host to the nonvolatile memory by transmitting, to the host again, the transfer request that includes the information indicating the first location of the write buffer of the host.

2. The memory system of claim 1, wherein
the first data is written to the nonvolatile memory using a multi-step program operation that includes at least a first-step program operation and a second-step program operation, and the controller is further configured to:
at a second timing after the first timing and before the fifth timing, instruct the nonvolatile memory to perform the first-step program operation for the first data; and
at a sixth timing after the fifth timing, instruct the nonvolatile memory to perform the second-step program operation for the first data.

3. The memory system of claim 2, wherein
the nonvolatile memory includes a page buffer and a plurality of word lines each connecting a plurality of memory cells, the plurality of word lines including at least a first word line, and
the controller is configured to:
at the first timing, transfer the first data from the first location of the write buffer of the host to the page buffer;
at the second timing, instruct the nonvolatile memory to perform the first-step program operation for the first data on the plurality of memory cells connected to the first word line;
at the fifth timing, transfer the first data from the first location of the write buffer of the host to the page buffer again; and
at the sixth timing, instruct the nonvolatile memory to perform the second-step program operation for the first data on the plurality of memory cells connected to the first word line.

4. The memory system of claim 3, wherein
the plurality of word lines further includes a second word line, and
the controller is further configured to:
at a third timing after the second timing and before the fifth timing, transfer second data from the write buffer of the host to the page buffer; and
at a fourth timing after the third timing and before the fifth timing, instruct the nonvolatile memory to perform the first-step program operation for the second data on the plurality of memory cells connected to the second word line.

5. The memory system of claim 1, further comprising:
an internal buffer, wherein
the controller is configured to:
at the first timing, store in the internal buffer, the first data transferred from the write buffer of the host, and then transfer the first data from the internal buffer to the nonvolatile memory; and at the fifth timing, store in the internal buffer, the first data transferred again from the write buffer of the host, and then transfer the first data from the internal buffer to the nonvolatile memory again.

6. The memory system of claim 1, wherein
the nonvolatile memory includes a plurality of physical blocks,
the controller is further configured to:
manage a plurality of block groups, each of the plurality of block groups including at least one of the plurality of physical blocks; and
perform a data erase operation in a unit of the block group, the first write request includes at least a first identifier to identify each of the plurality of block groups, and
the controller is further configured to determine, based on the first identifier included in the first write request, a write-destination block group from the plurality of block groups to write the first data.

7. The memory system of claim 6, wherein
the nonvolatile memory further includes a plurality of chips,
the first write request further includes a second identifier to identify each of the plurality of chips, and
the controller is configured to determine, further based on the second identifier included in the first write request, the write-destination block group from the plurality of block groups.

8. The memory system of claim 6, wherein
each of the plurality of block groups includes only one physical block.

9. The memory system of claim 1, wherein
the nonvolatile memory includes a plurality of blocks, each of the plurality of blocks being a unit for a data erase operation,
the controller is further configured to:
manage a plurality of streams; and
assign the plurality of streams to the plurality of blocks,
the first write request includes at least a first identifier to identify each of the plurality of streams, and
the controller is further configured to determine, based on the first identifier included in the first write request, a write-destination block from the plurality of blocks to write the first data.

10. The memory system of claim 1, wherein
the controller is further configured to:
in response to receiving, from the host, a read request to read the first data in a period after starting to transfer the first data to the nonvolatile memory before the first data becomes readable from the nonvolatile memory,
transmit, to the host as a response to the read request, a request that the host obtain the first data from the write buffer of the host.

11. A memory system connectable to a host, comprising:
a nonvolatile memory; and
a controller electrically connected to the nonvolatile memory and configured to:
receive, from the host, a first write request that includes storage location information indicating a first location of a write buffer on a memory of the host as a transfer source of first data; and
write the first data to the nonvolatile memory using a multi-step program operation that includes a plurality of program operations by:
in each of the plurality of program operations of the multi-step program operation, without receiving the first write request again, obtaining the first data from the first location of the write buffer of the host by transmitting, to the host, a transfer request that includes information indicating the first location of the write buffer of the host; and transferring the first data to the nonvolatile memory.

12. The memory system of claim 11, wherein
the controller is further configured to:
in each of the plurality of program operations of the multi-step program operation,
after transferring the first data to the nonvolatile memory, instruct the nonvolatile memory to perform one of the plurality of program operations for the first data.

13. The memory system of claim 12, wherein
the nonvolatile memory includes a page buffer and a plurality of word lines each connecting a plurality of memory cells, the plurality of word lines including at least a first word line, and
the controller is configured to:
in each of the plurality of program operations of the multi-step program operation,
transfer the first data from the first location of the write buffer of the host to the page buffer; and
instruct the nonvolatile memory to perform the one of the plurality of program operations for the first data on the plurality of memory cells connected to the first word line.

14. The memory system of claim 13, wherein
the plurality of program operations includes at least a first-step program operation and a second-step program operation,
the plurality of word lines further includs-includes a second word line, and
the controller is further configured to:
after instructing the nonvolatile memory to perform the first-step program operation for the first data on the plurality of memory cells connected to the first word line and before transferring the first data from the first location of the write buffer of the host to the page buffer for the second-step program operation of the first data,
transfer second data from the write buffer of the host to the page buffer; and
instruct the nonvolatile memory to perform the first-step program operation for the second data on the plurality of memory cells connected to the second word line.

15. The memory system of claim 11, further comprising:
an internal buffer, wherein
the controller is configured to:
in each of the plurality of program operations of the multi-step program operation,
store in the internal buffer, the first data transferred from the write buffer of the host, and then transfer the first data from the internal buffer to the nonvolatile memory.

16. The memory system of claim 11, wherein
the nonvolatile memory includes a plurality of physical blocks,
the controller is further configured to:
manage a plurality of block groups, each of the plurality of block groups including at least one of the plurality of physical blocks; and
perform a data erase operation in a unit of the block group,
the first write request includes at least a first identifier to identify each of the plurality of block groups, and
the controller is further configured to determine, based on the first identifier included in the first write request, a write-destination block group from the plurality of block groups to write the first data.

17. The memory system of claim 16, wherein
the nonvolatile memory further includes a plurality of chips,
the first write request further includes a second identifier to identify each of the plurality of chips, and
the controller is configured to determine, further based on the second identifier included in the first write request, the write-destination block group from the plurality of block groups.

18. The memory system of claim 16, wherein
each of the plurality of block groups includes only one physical block.

19. The memory system of claim 11, wherein
the nonvolatile memory includes a plurality of blocks, each of the plurality of blocks being a unit for a data erase operation,
the controller is further configured to:
manage a plurality of streams; and
assign the plurality of streams to the plurality of blocks,
the first write request includes at least a first identifier to identify each of the plurality of streams, and
the controller is further configured to determine, based on the first identifier included in the first write request, a write-destination block from the plurality of blocks to write the first data.

20. The memory system of claim 11, wherein
the controller is further configured to:
in response to receiving, from the host, a read request to read the first data in a period after starting to transfer the first data to the nonvolatile memory before the first data becomes readable from the nonvolatile memory,
transmit, to the host as a response to the read request, a request that the host obtain the first data from the write buffer of the host.

* * * * *